US012799791B2

(12) United States Patent
Saito

(10) Patent No.: US 12,799,791 B2
(45) Date of Patent: Nov. 17, 2026

(54) ROTATION BRAKING DEVICE

(71) Applicant: PIOLAX, INC., Kanagawa (JP)

(72) Inventor: Jun Saito, Yokohama (JP)

(73) Assignee: PIOLAX, INC., Kanagawa (JP)

( * ) Notice: Subject to any disclaimer, the term of this patent is extended or adjusted under 35 U.S.C. 154(b) by 0 days.

(21) Appl. No.: 19/142,968

(22) PCT Filed: Dec. 28, 2023

(86) PCT No.: PCT/JP2023/047191
§ 371 (c)(1),
(2) Date: Jun. 25, 2025

(87) PCT Pub. No.: WO2024/143526
PCT Pub. Date: Jul. 4, 2024

(65) Prior Publication Data

US 2026/0218559 A1 Jul. 30, 2026

(30) Foreign Application Priority Data

Dec. 28, 2022 (JP) ................................ 2022-211061

(51) Int. Cl.
*E05F 3/14* (2006.01)

(52) U.S. Cl.
CPC ............ *E05F 3/14* (2013.01); *E05Y 2201/21* (2013.01); *E05Y 2201/266* (2013.01); *E05Y 2900/538* (2013.01)

(58) Field of Classification Search
CPC .. E05F 3/14; E05Y 2201/21; E05Y 2201/266; E05Y 2900/538

(Continued)

(56) References Cited

U.S. PATENT DOCUMENTS

| | | | | |
|---|---|---|---|---|
| 7,066,308 B2 * | 6/2006 | Kanno | ...................... | F16F 9/34 188/290 |
| 8,336,685 B2 * | 12/2012 | Inaba | ........................ | E05F 3/14 464/24 |

(Continued)

FOREIGN PATENT DOCUMENTS

| | | |
|---|---|---|
| JP | H05-089993 A | 12/1993 |
| JP | H11-101277 A | 4/1999 |

(Continued)

OTHER PUBLICATIONS

Feb. 20, 2024, International Search Report issued for related PCT Application No. PCT/JP2023/047191.

(Continued)

*Primary Examiner* — Jeffrey O'Brien
(74) *Attorney, Agent, or Firm* — Paratus Law Group, PLLC

(57) ABSTRACT

A rotation braking device is configured to be attached between a pair of members. The rotation braking device includes: a braking member including a first rotation member; a second rotation member; and a swing rotation member swingably supported with respect to the second rotation member. When the other member rotates in a predetermined direction with respect to one member, the swing rotation member swings in a direction in which a second engaging portion engages with a first engaging portion, and the first rotation member and the swing rotation member integrally rotate. When the other member rotates in a direction opposite to the predetermined direction with respect to the one member, the swing rotation member swings in a direction in which the second engaging portion is separated from the first engaging portion, and the swing rotation member idles with respect to the first rotation member.

8 Claims, 29 Drawing Sheets

(58) Field of Classification Search
USPC .......................................................... 188/291
See application file for complete search history.

(56) References Cited

U.S. PATENT DOCUMENTS 9,080,628 B2 * 7/2015 Shumozaki ............. F16D 41/06
9,103,390 B2 * 8/2015 Shimozaki .............. F16D 41/00
9,382,965 B2 * 7/2016 Zhang ....................... E05F 3/14
9,731,655 B2 * 8/2017 Nakasone .............. B60N 2/793
11,821,488 B2 * 11/2023 Hilpert ................ B29C 45/1676
11,828,345 B2 * 11/2023 Takahashi ............... F16D 41/18
12,485,828 B2 * 12/2025 Fukui ........................ B60R 7/04
2003/0173165 A1 * 9/2003 Muller ...................... F16F 9/12 188/82.1
2004/0099495 A1 * 5/2004 Hayashi .................... F16F 9/12 188/290
2005/0115784 A1 * 6/2005 Muller ...................... F16F 9/12 188/82.1
2012/0305351 A1 * 12/2012 Kopto ....................... F16F 9/12 188/272
2013/0209221 A1 * 8/2013 Kearsey .................... E05F 3/20 415/119

FOREIGN PATENT DOCUMENTS

JP 2004-176806 A 6/2004
JP 4080921 B2 4/2008
JP 2020-204347 A 12/2020

OTHER PUBLICATIONS

Feb. 20, 2024, International Search Opinion issued for related PCT Application No. PCT/JP2023/047191.

* cited by examiner

ROTATION BRAKING DEVICE

CROSS REFERENCE TO PRIOR APPLICATION

This application is a National Stage Patent Application of PCT International Patent Application No. PCT/JP2023/047191 (filed on Dec. 28, 2023) under 35 U.S.C. § 371, which claims priority to Japanese Patent Application No. 2022-211061 (filed on Dec. 28, 2022), which are all hereby incorporated by reference in their entirety.

TECHNICAL FIELD

The present invention relates to a rotation braking device used, for example, for braking an opening and closing operation of a console box of an automobile.

BACKGROUND ART

For example, a rotation braking device is sometimes used in a console box or a glove box of an automobile to prevent a lid from opening suddenly and to allow the lid to open gradually. In addition, a braking device that is attached to a pair of members and exerts a braking force when one member moves with respect to the other member is known in the related art.

As such a braking device, Patent Literature 1 below describes an one-direction braking device including a first housing defining a first chamber containing a viscous fluid and including a first locking portion, a braking rotor rotatably accommodated in the first chamber, and a second housing defining a second chamber. Further, the one-direction braking device further includes a pinion attached to a rotation shaft of the braking rotor and a toothed rod that engages with the pinion in order to transmit a rotational force from an outside to the braking rotor.

CITATION LIST

Patent Literature

Patent Literature 1: JP4080921B

SUMMARY OF INVENTION

Technical Problem

In the case of the one-direction braking device in Patent Literature 1, a rack-and-pinion structure is adopted in which the toothed rod linearly moves, the linear movement is converted into rotational movement via the pinion, and the rotational movement is transmitted to the braking rotor.

That is, the one-direction braking device can be applied to a linearly moving structure, but cannot be applied to a structure in which a pair of members relatively rotate, such as a console box or a glove box, in which a lid rotates with respect to a box, as a rotation shaft.

Therefore, an object of the present invention is to provide a rotation braking device that is attached between a pair of members that rotate relative to each other and applies a braking force when one member rotates in a predetermined direction relative to the other member.

Solution to Problem

In order to achieve the above object, the present invention provides a rotation braking device that is configured to be attached between a pair of members configured to rotate relative to each other and that is configured to apply a braking force when the other member rotates in a predetermined direction with respect to one member, the rotation braking device including:

a braking member including a coupling member that is coupled to the one member and a first rotation member configured to rotate with respect to the coupling member via a rotation support portion, and configured to generate the braking force when the first rotation member rotates with respect to the coupling member, a second rotation member coaxially and rotatably mounted on the braking member via the rotation support portion; and a swing rotation member coupled to the other member, swingably supported with respect to the second rotation member via a swing support portion, and disposed on an outer periphery or an inner periphery of the first rotation member, in which the first rotation member includes a first engaging portion configured to engage with the swing rotation member, the swing rotation member includes a second engaging portion configured to engage with the first engaging portion in a connectable and separable manner, a swing direction of the swing rotation member is to change depending on a rotation direction of the other member.

when the other member rotates in the predetermined direction with respect to the one member, the swing rotation member swings in a direction in which the second engaging portion engages with the first engaging portion, and the first rotation member and the swing rotation member integrally rotate, and when the other member rotates in a direction opposite to the predetermined direction with respect to the one member, the swing rotation member swings in a direction in which the second engaging portion is separated from the first engaging portion, and the swing rotation member idles with respect to the first rotation member

Advantageous Effects of Invention

In the present invention, when the other member rotates in a predetermined direction with respect to the one member, a swing rotation member swings in a direction in which a second engaging portion engages with a first engaging portion, and a first rotation member and the swing rotation member integrally rotate, so that the first rotation member rotates with respect to a coupling member, and a braking force of a braking member is generated.

On the other hand, when the other member rotates in a direction opposite to the predetermined direction with respect to the one member, the swing rotation member swings in a direction in which the second engaging portion is separated from the first engaging portion, and the swing rotation member idles with respect to the first rotation member, so that the first rotation member does not rotate with respect to the coupling member, and the braking force of the braking member is not generated.

Therefore, it is possible to obtain a rotation braking device that applies the braking force when the other of the pair of relatively rotating members rotates in the predetermined direction with respect to the one member, and does not apply the braking force when the other member rotates in the direction opposite to the predetermined direction with respect to the one member

DESCRIPTION OF EMBODIMENTS

First Embodiment of Rotation Braking Device

Hereinafter, a rotation braking device according to a first embodiment of the present invention will be described with reference to the drawings.

Figure 1:
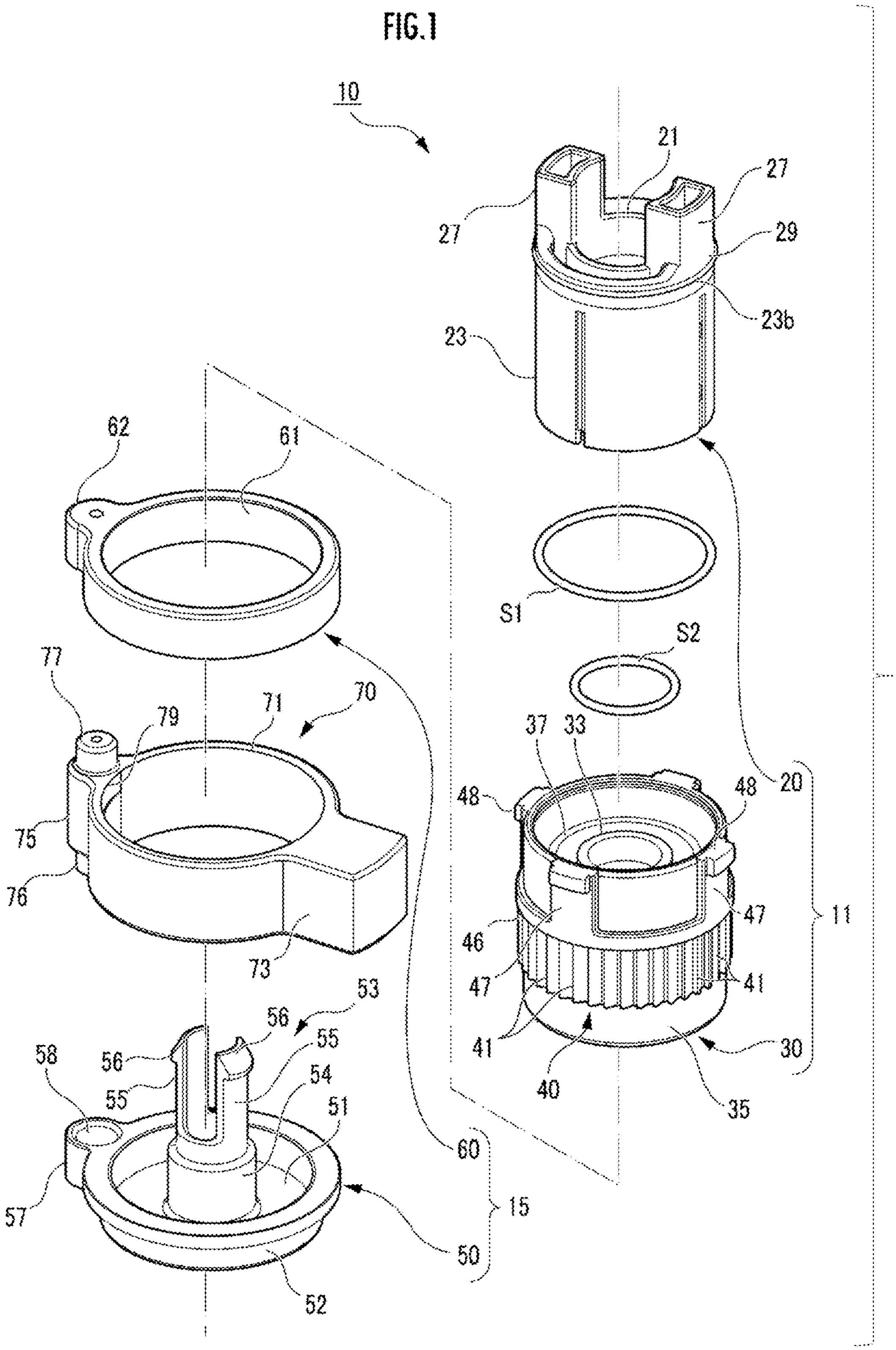
FIG. 1 is an exploded perspective view showing a rotation braking device according to a first embodiment of the present invention.
Figure 2:
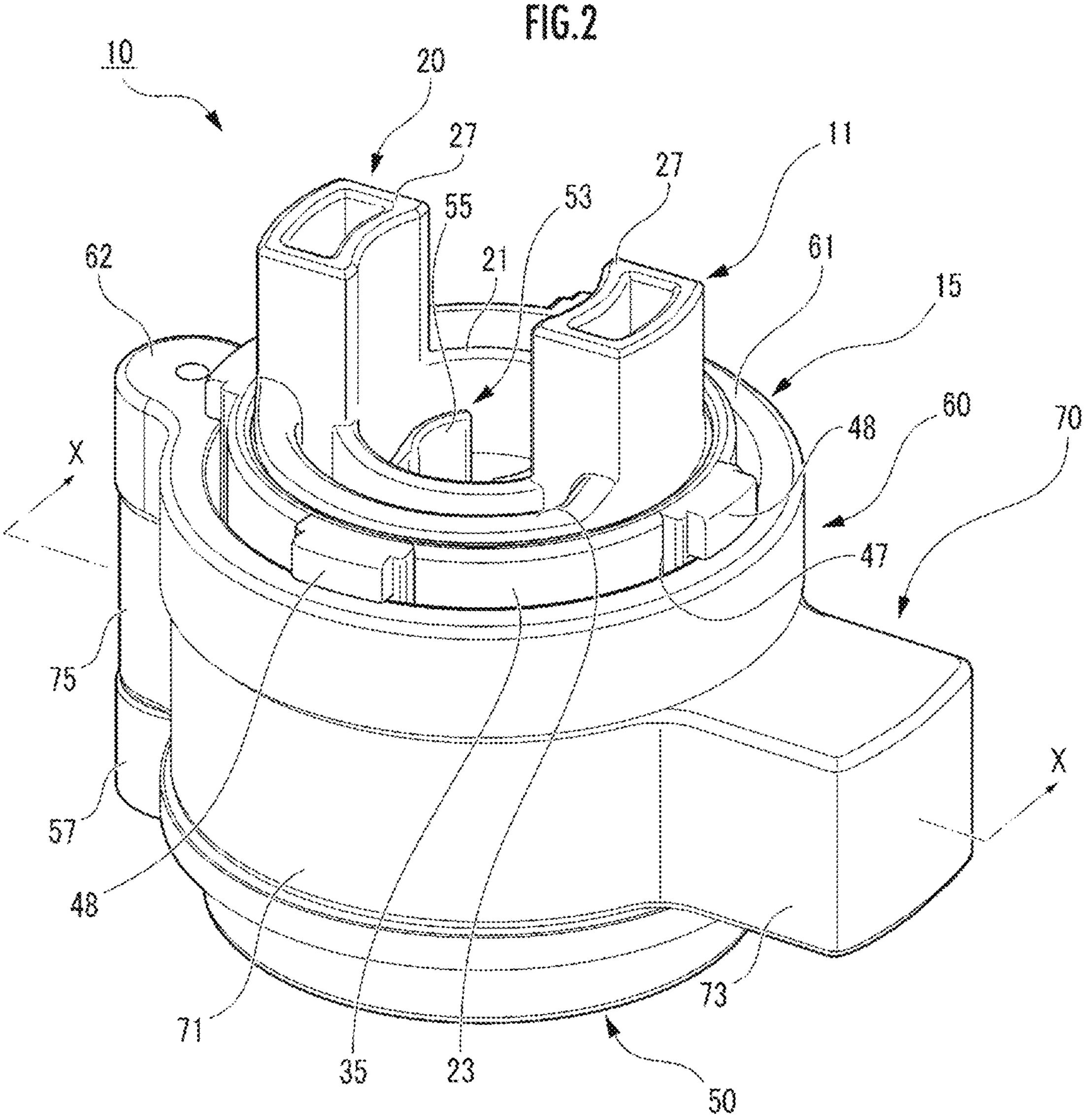
FIG. 2 is a perspective view of the rotation braking device.
Figure 15:
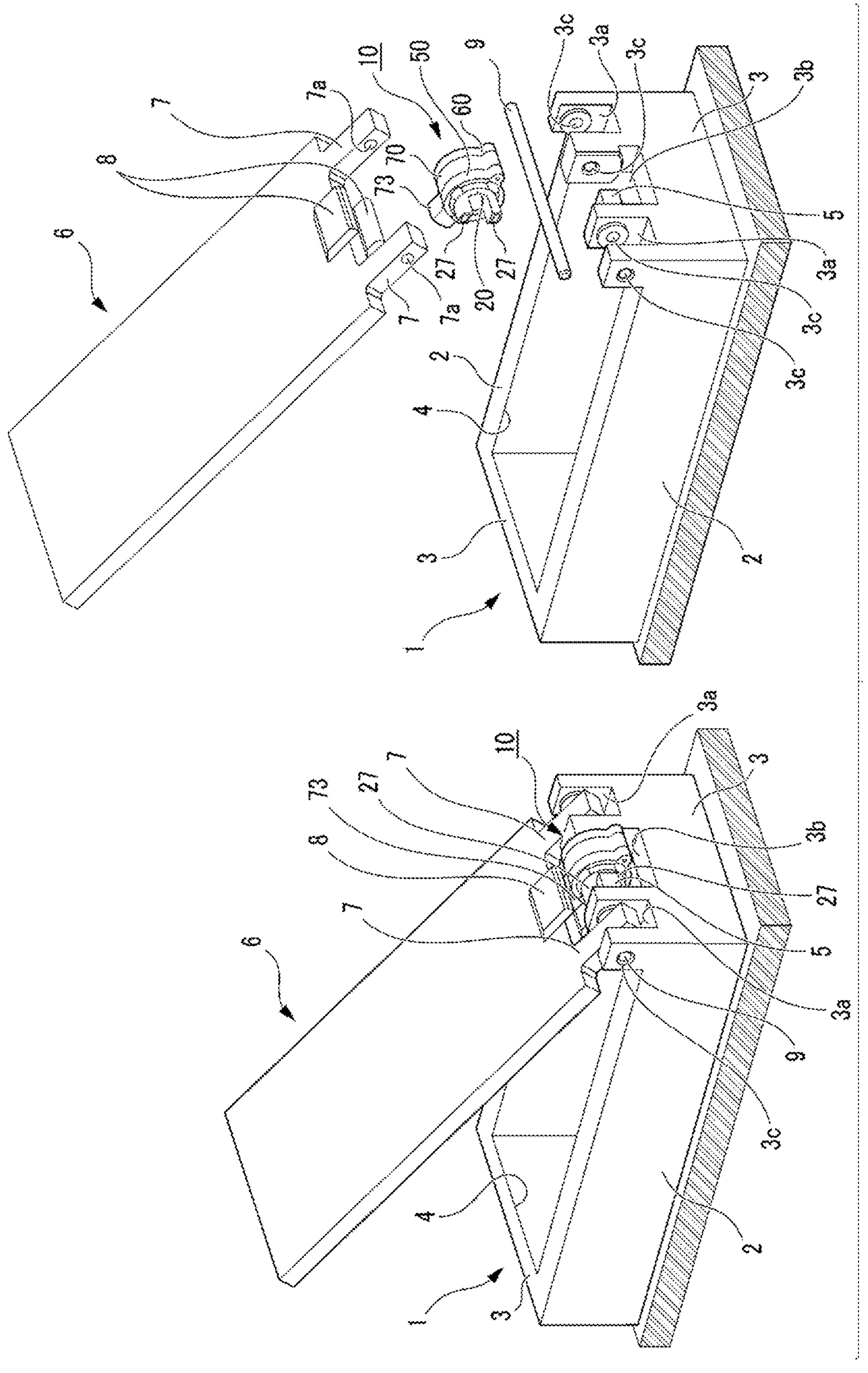
FIG. 15 shows the pair of members to which the rotation braking device can be applied, and shows a perspective view and an exploded perspective view showing an assembled state thereof.

A rotation braking device 10 shown in FIGS. 1 and 2 is attached between a pair of members that rotate relative to each other, and applies a braking force when the other member rotates in a predetermined direction with respect to one member For example, as shown in FIG. 15, the rotation braking device 10 can be used, for example, for performing braking of a lid that is attached in an openable and closable manner to an opening portion of a console box of an automobile. The rotation braking device 10 may be used for performing braking of a glove box or a lid that is attached in an openable and closable manner to an opening portion of an accommodating portion provided in an instrument panel of an automobile, and is not particularly limited.

In the following embodiment, one member is a fixed body such as a console box, which will be described as a first member 1. Further, the other member is an opening and closing body such as a lid attached to an opening portion of the fixed body in an openable and closable manner, which will be described as a second member 6.

As shown in FIG. 15, the first member 1, which is the one member, includes a pair of side walls 2, 2 extending in a long plate shape and arranged in parallel to each other, and coupling walls 3, 3 coupling both end portions of the pair of side walls 2, 2 in an extension direction, and has a long quadrangular box shape having an opening portion 4 on an upper side.

Further, a pair of notch portions 3*a*, 3*a* are formed above one coupling wall 3 on both sides in a width direction. Furthermore, a braking device disposing concave portion 3*b* is formed above the one coupling wall 3 and between the pair of notch portions 3*a*, 3*a*.

A plurality of shaft insertion holes 3*c* are coaxially formed in the pair of notch portions 3*a*, 3*a* and the braking device disposing concave portion 3*b*. Further, a coupled portion 5 having a protrusion shape protrudes from one inner surface of the braking device disposing concave portion 3*b*. The coupled portion 5 is sandwiched between a pair of coupling protruding portions 27, 27 of the coupling member 20 to be described later (see FIG. 15).

On the other hand, the second member 6, which is the other member, has a substantially long plate shape fitting to the opening portion 4 of the first member 1, and a pair of protruding pieces 7, 7 protrude from a base end portion in a longitudinal direction thereof. A shaft insertion hole 7*a* is formed in each of the protruding pieces 7, 7. The pair of protruding pieces 7, 7 are respectively inserted and disposed in the pair of notch portions 3*a*, 3*a* of the first member 1.

Further, by inserting a support shaft 9 through the shaft insertion hole 3*c* on a first member 1 side and the shaft insertion hole 7*a* on a second member 6 side, the second member 6 is rotatably attached to the first member 1 via the support shaft 9.

A pair of coupled portions 8, 8 protrude from the base end portion of the second member 6 in the longitudinal direction and a portion between the pair of protruding pieces 7, 7. A coupling protruding portion 73 of a swing rotation member 70 to be described later is inserted between the pair of coupled portions 8, 8 (see FIG. 15).

Further, the rotation braking device 10 according to the present embodiment includes a braking member 11 that includes the coupling member 20 coupled to the one member (first member 1) and a first rotation member 30 that rotates with respect to the coupling member 20 via a rotation support portion, and generates a braking force when the first rotation member 30 rotates with respect to the coupling member 20, a second rotation member 15 that is coaxially mounted on the braking member 11 via the rotation support portion, and the swing rotation member 70 that is coupled to the other member (second member 6), is swingably supported with respect to the second rotation member 15 via a swing support portion, and is disposed on an outer periphery of the first rotation member 30.

In this embodiment, the swing support portion is provided at an eccentric position with respect to the rotation support portion.

The second rotation member 15 includes a first case 50 and a second case 60 disposed to face the first case 50 (see FIG. 1).

Figure 8:
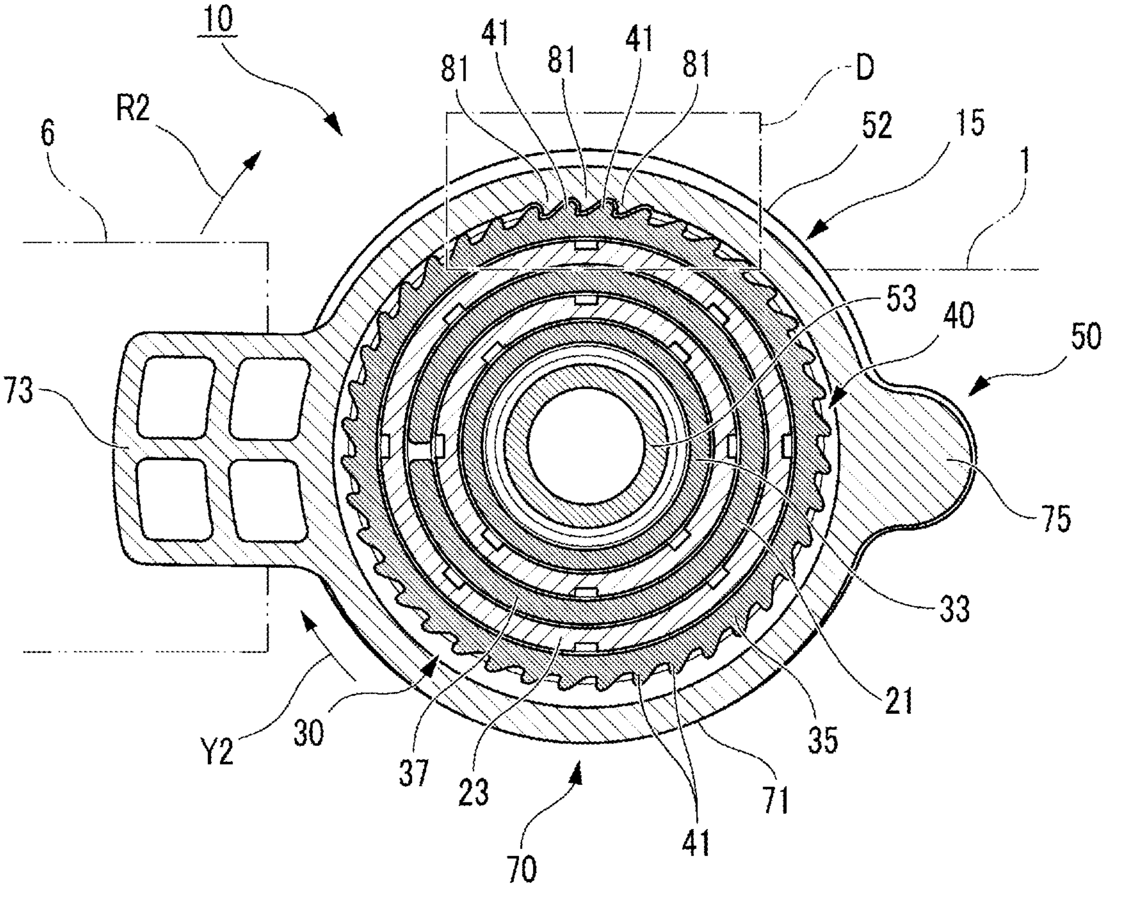
FIG. 8 is a cross-sectional view taken along the line A-A in FIG. 4 in a state (state rotated from FIG. 6) in which the other member rotates in a predetermined direction with respect to one member after the braking force is generated in the rotation braking device.
Figure 9:
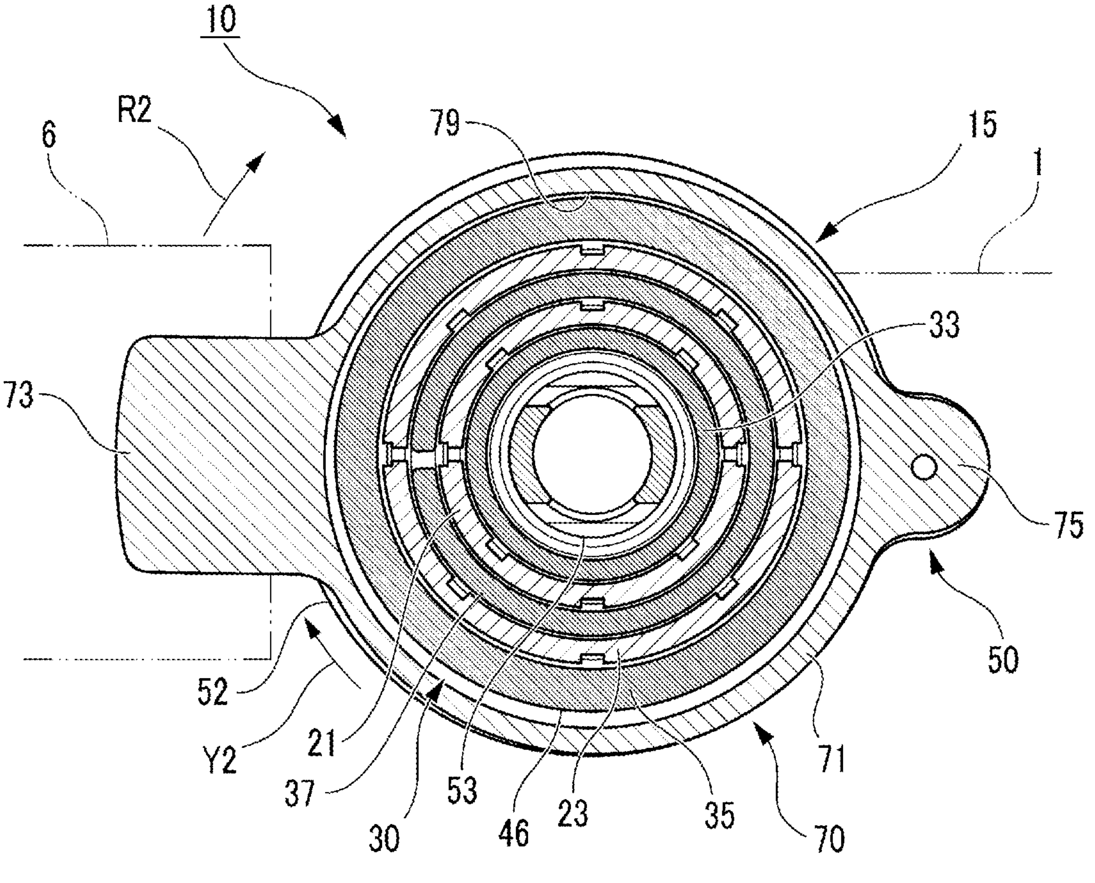
FIG. 9 is a cross-sectional view taken along a line B-B in FIG. 4 in the state of FIG. 8.
Figure 13:
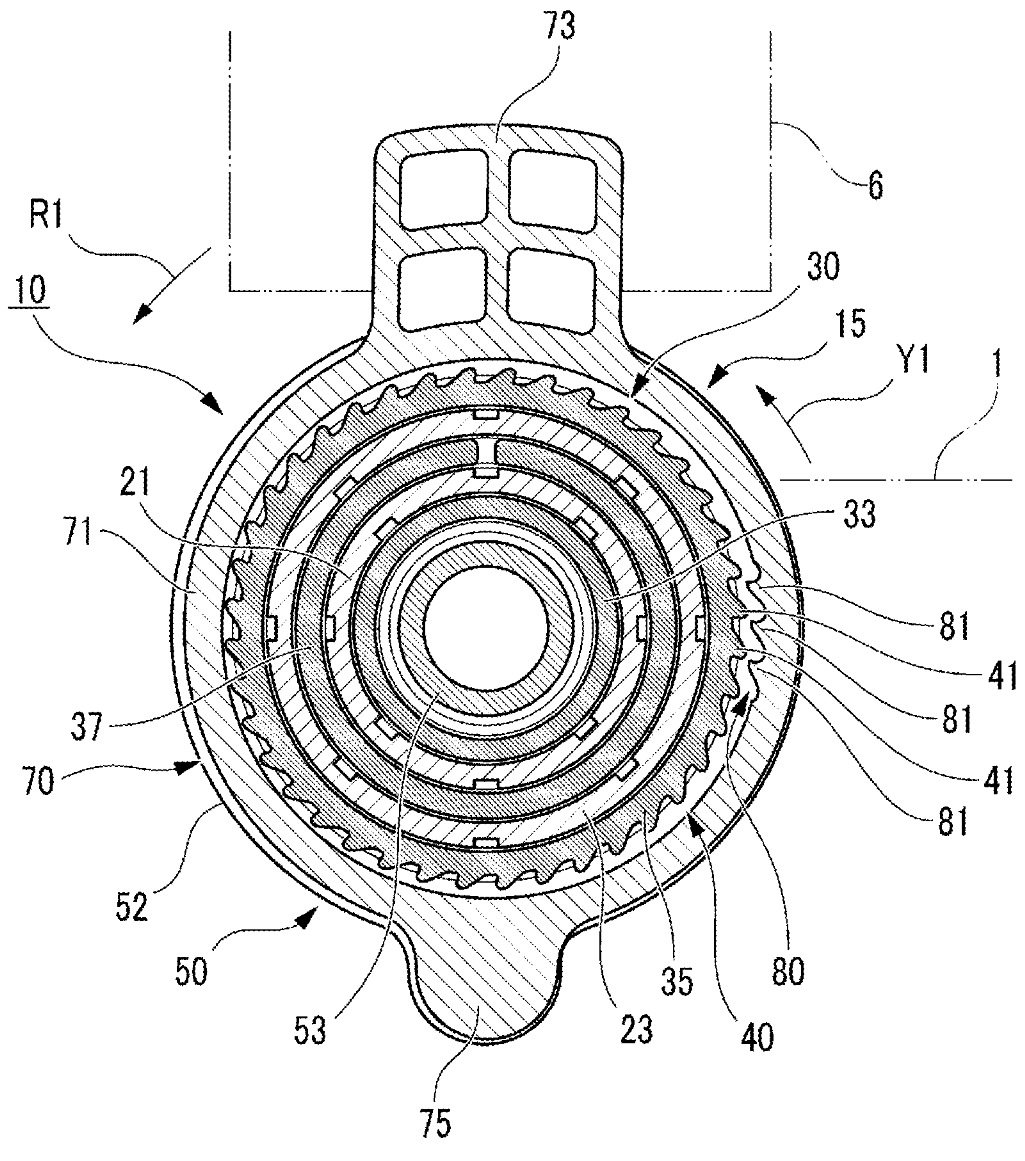
FIG. 13 is a cross-sectional view taken along the line A-A in FIG. 4 in a state (state rotated from FIG. 11) in which the other member rotates in a direction opposite to the predetermined direction with respect to the one member after no braking is applied in the rotation braking device.
Figure 14:
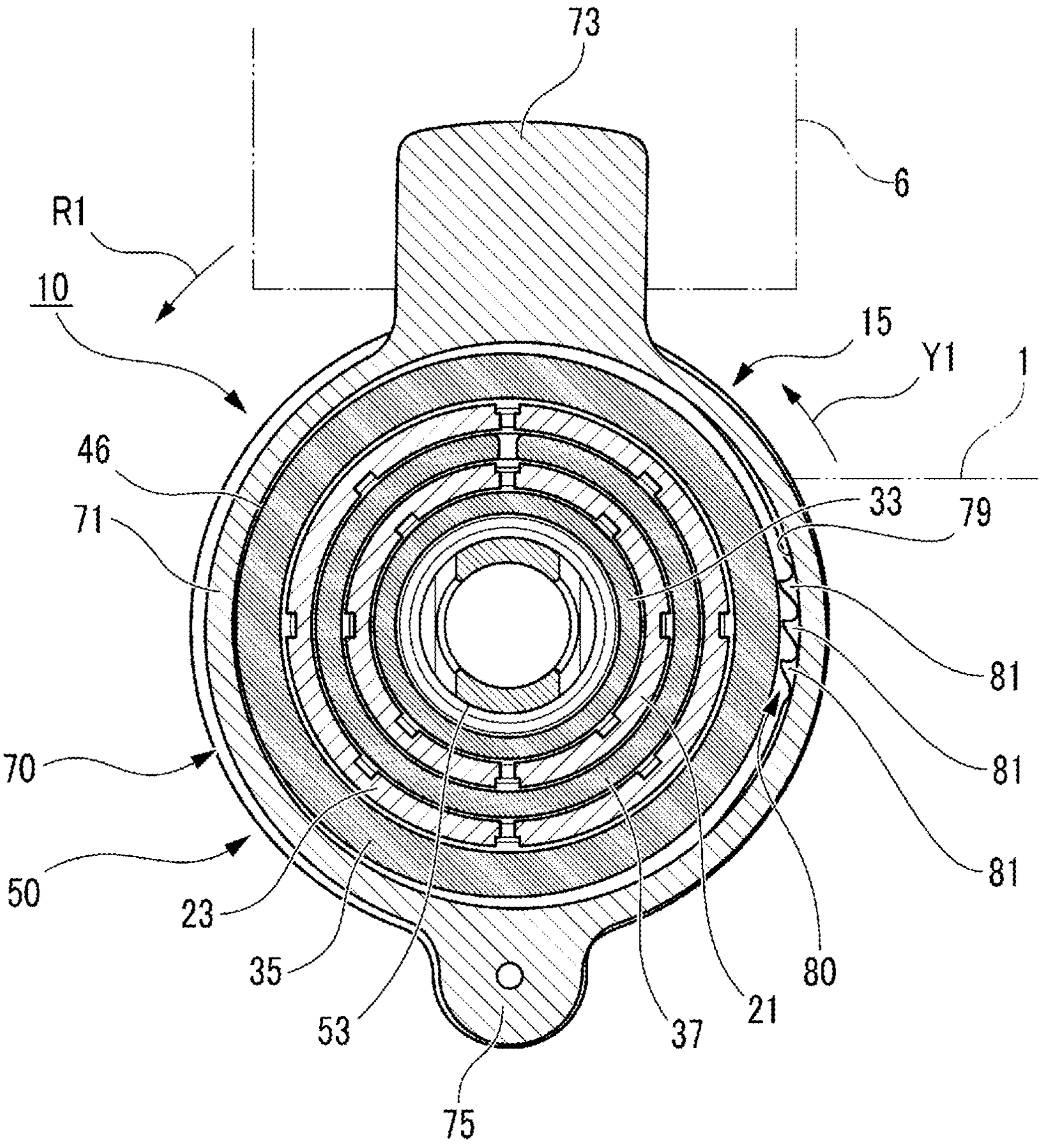
FIG. 14 is a cross-sectional view taken along the line B-B in FIG. 4 in the state of FIG. 13.

In addition, the first rotation member 30 includes a first engaging portion 40 that engages with the swing rotation member 70, and the swing rotation member 70 further includes a second engaging portion 80 (see FIG. 3) that engages with the first engaging portion 40 in a connectable and separable manner Further, in the rotation braking device 10, a swing direction of the swing rotation member 70 changes (it can be said that a swing direction switches) depending on a rotation direction of the other member (second member 6) (see an arrow Y1 in FIGS. 13 and 14 and an arrow Y2 in FIGS. 8 and 9).

That is, when the other member (second member 6) rotates in the predetermined direction (see an arrow R1 in FIGS. 13 and 14) with respect to the one member (first member 1), the swing rotation member 70 swings (see the arrow Y1 in FIGS. 13 and 14) in a direction in which the second engaging portion 80 engages with the first engaging portion 40 (see FIGS. 6, 8, and 10), and the first rotation member 30 and the swing rotation member 70 integrally rotate (see FIGS. 6 to 9).

The predetermined rotation direction of the second member 6 with respect to the first member 1 is referred to as a "rotation direction R1" or an "R1 direction" (see FIGS. 13 and 14). Further, a direction in which the swing rotation member 70 swings with respect to the second rotation member 15 in the direction in which the second engaging portion 80 engages with the first engaging portion 40 is referred to as a "swing direction Y1" or a "Y1 direction" (see FIGS. 13 and 14).

On the other hand, when the other member (second member 6) rotates relative to the one member (first member 1) in a direction opposite to the predetermined direction (see an arrow R2 in FIGS. 8 and 9), the swing rotation member 70 swings (see the arrow Y2 in FIGS. 8 and 9) in a direction in which the second engaging portion 80 is separated from the first engaging portion 40 (see FIGS. 11 and 13), and the swing rotation member 70 idles with respect to the first rotation member 30 (see FIGS. 11 to 14).

The direction opposite to the predetermined direction of the second member 6 with respect to the first member 1 is referred to as a "rotation direction R2" or an "R2 direction" (see FIGS. 8 and 9). Further, a direction in which the swing rotation member 70 swings with respect to the second rotation member 15 in a direction in which the second engaging portion 80 is separated from the first engaging portion 40 is referred to as a "swing direction Y2" or a "Y2 direction" (see FIGS. 8 and 9).

In this embodiment, when the braking member 11 and the swing rotation member 70 are viewed from an axial direction, at least the swing rotation member 70 is disposed on the outer periphery of the first rotation member 30, and the swing support portion is disposed outside the first rotation member 30. Further, the outer periphery of the first rotation member 30 and the inner periphery of the swing rotation member 70 each have a circular shape.

First, the coupling member 20 constituting the braking member 11 will be described with reference to FIOS. 1, 2, and 5 to 7 and the like.

Figure 5:
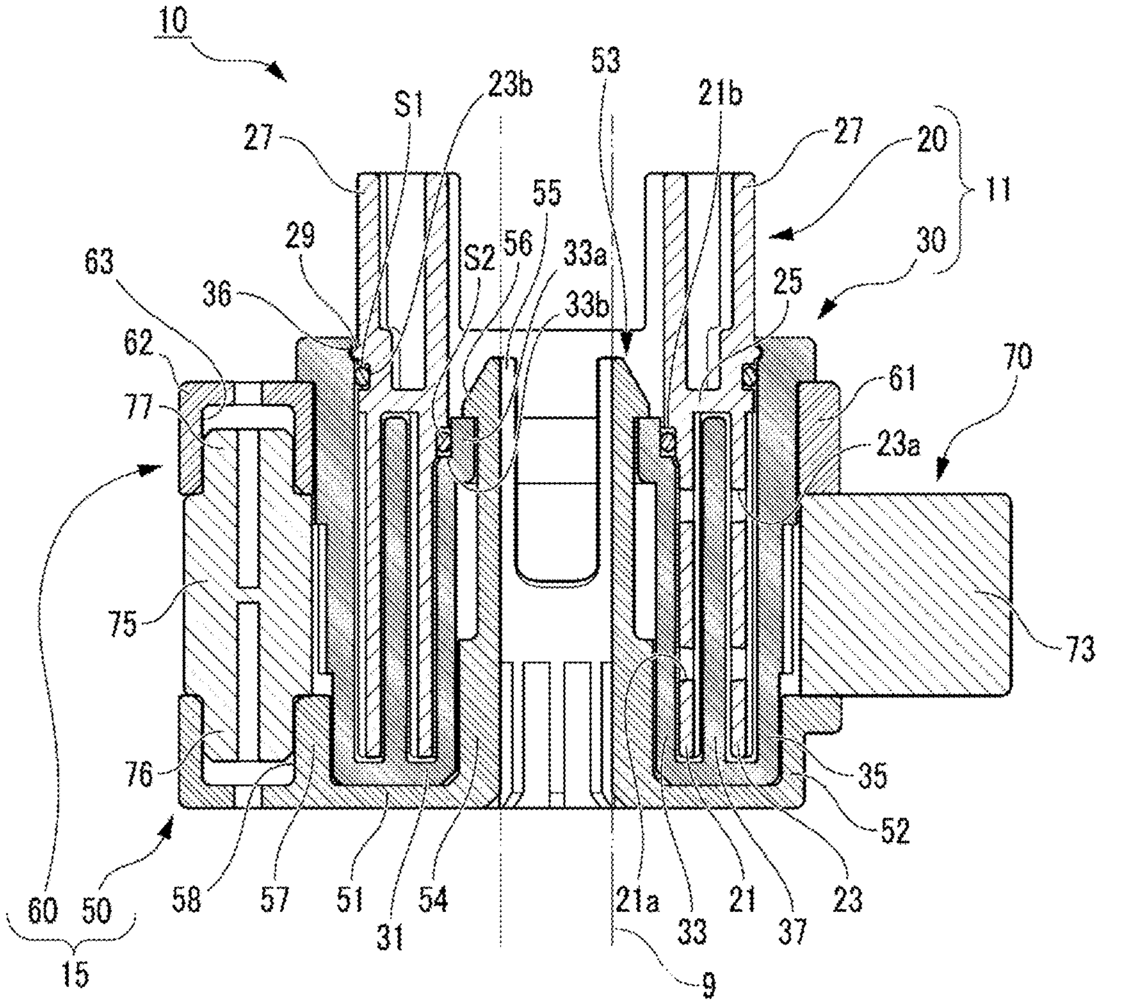
FIG. 5 is a cross-sectional view taken along a line X-X in FIG. 2.

As shown in FIG. 5, the coupling member 20 in this embodiment includes an inner cylindrical portion 21 having substantially cylindrical shape and extending with a predetermined length, an outer cylindrical portion 23 having a substantially cylindrical shape and coaxially disposed outside the inner cylindrical portion 21 with a predetermined gap therebetween and extending with a predetermined length, and a coupling plate portion 25 having an annular plate shape and coupling the inner cylindrical portion 21 and the outer cylindrical portion 23 to each other at a predetermined position (position close to a base end portion in an extension direction of both the cylindrical portions 21, 23).

In the following description, the extension direction of both the cylindrical portions 21, 23 will be described as an axial direction of the braking member 11. Extension directions of the respective cylindrical portions 33, 35, and 37 of the first rotation member 30 constituting the braking member 11, which will be described later, have the same meaning.

As shown in FIG. 5, a plurality of communication holes 21*a*, 23*a* are formed at predetermined positions of both the cylindrical portions 21, 23, and a viscous fluid (not shown) filled in the braking member 11 can flow therethrough.

Furthermore, the pair of coupling protruding portions 27, 27 protrude in the axial direction of the braking member 11 from positions of both the cylindrical portions 21, 23 on the base end portion side in the extension direction and facing each other in a radial direction of the coupling member 20. The pair of coupling protruding portions 27, 27 sandwich the coupled portion 5 of the first member 1, so that the coupling member 20 is coupled to the first member 1 so as not to rotate.

As shown in FIGS. 1 and 5, an annular convex portion 29 protrudes from an outer periphery of the base end portion of the outer cylindrical portion 23 in the extension direction. The annular convex portion 29 is fitted in an annular concave portion 36 of the first rotation member 30 in a convex and concave way (see FIG. 5).

Further, as shown in FIGS. 1 and 5, a ring mounting groove 23*b* having an annular groove shape is formed at a base end portion of the outer cylindrical portion 23 in the extension direction and at a position on a tip end portion side in the extension direction with respect to the annular convex portion 29. A first seal ring S1 is mounted in the ring mounting groove 23*b*. An outer periphery of the first seal ring S1 abuts against an inner periphery of the outer cylindrical portion 35 (to be described later) of the first rotation member 30 to seal the viscous fluid filled in the braking member 11.

A stepped ring disposing portion 21*b* is formed on an inner periphery of the inner cylindrical portion 21 in the vicinity of the base end portion in the extension direction thereof. An outer periphery of a second seal ring S2 is disposed in a manner of abutting against the ring disposing portion 21*b*.

Next, the first rotation member 30 constituting the braking member 11 will be described with reference to FIGS. 1 and 5 to 7 and the like.

The first rotation member 30 includes a base portion 31 having an annular plate shape, the inner cylindrical portion 33 having a substantially cylindrical shape and extending by a predetermined length from an inner peripheral edge portion of the base portion 31, the outer cylindrical portion 35 having a substantially cylindrical shape and extending by a predetermined length from an outer peripheral edge portion of the base portion 31, and the intermediate cylindrical portion 37 extending by a predetermined length from one end surface in a thickness direction of the base portion 31 between the inner cylindrical portion 33 and the outer cylindrical portion 35, and has a multi-cylindrical structure in which the cylindrical portions 33, 35, 37 are coaxially disposed.

Since the first rotation member 30 includes the outer cylindrical portion 35 having the substantially cylindrical shape, it can be said that the outer periphery of the first rotation member 30 has a circular shape.

As shown in FIG. 5, the inner cylindrical portion 21 of the coupling member 20 is rotatably inserted into a gap between the inner cylindrical portion 33 and the intermediate cylindrical portion 37, and the outer cylindrical portion 23 of the coupling member 20 is rotatably inserted into a gap between the intermediate cylindrical portion 37 and the outer cylindrical portion 35. As a result, the first rotation member 30 is rotatably supported with respect to the coupling member 20.

That is, in this embodiment, the first rotation member 30 is rotatably supported with respect to the coupling member 20 by the two cylindrical portions 21, 23 of the coupling member 20 and the cylindrical portions 33, 35, 37 of the first rotation member 30. Further, gaps among the cylindrical portions 21, 23, 33, 35, 37 are filled with the viscous fluid.

Figure 6:
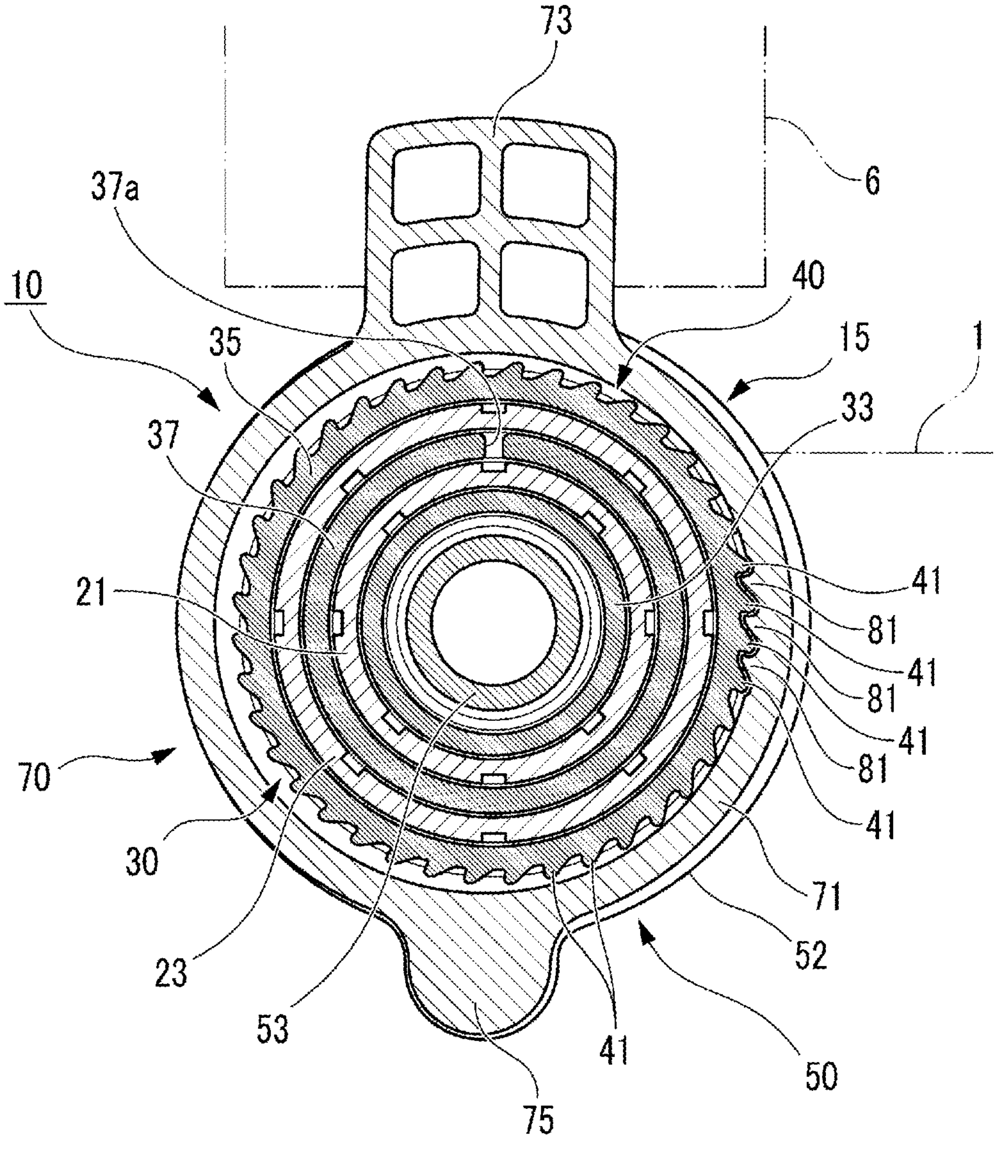
FIG. 6 is a cross-sectional view taken along a line A-A in FIG. 4 and illustrating an initial state in which a braking force is generated in the rotation braking device.

Further, as shown in FIG. 6, a notch 37*a* extending along the axial direction of the braking member 11 is formed at a predetermined position in a circumferential direction of the intermediate cylindrical portion 37. The gap between the inner cylindrical portion 33 and the intermediate cylindrical portion 37 and the gap between the intermediate cylindrical portion 37 and the outer cylindrical portion 35 can communicate with each other via the notch 37*a*.

As shown in FIG. 5, a stepped ring disposing portion 33*b* is formed on an outer periphery of the inner cylindrical portion 33 on a base end portion side with respect to a tip end portion 33*a* in the extension direction. An inner periphery of the second seal ring S2 abuts against the ring disposing portion 33*b*. The second seal ring S2 also seals the viscous fluid filled in the braking member 11.

Further, when the first rotation member 30 rotates with respect to the coupling member 20, the braking force of the braking member 11 is exerted by viscous resistance or the like of the viscous fluid sealed in the gaps among the cylindrical portions 21, 23, 33, 35, 37 by the seal rings S1 and S2.

In addition, the annular concave portion 36 having an annular concave groove shape is formed on an inner periphery of a tip end portion of the outer cylindrical portion 35 in the extension direction (see FIG. 5). The annular convex portion 29 of the coupling member 20 is fitted in the annular concave portion 36 in the convex and concave way, so that the first rotation member 30 is held with respect to the coupling member 20 so as not to come off in the axial direction of the braking member 11.

Further, the first engaging portion 40 is provided at a predetermined position in an axial direction of the outer cylindrical portion 35 having a circular outer periphery. Furthermore, the first engaging portion 40 is provided on the outer periphery of the first rotation member 30 at a position that is shifted in the axial direction with respect to an abutment portion 46 (to be described later).

As shown in FIG. 1, the first engaging portion 40 in this embodiment includes a plurality of first engaging teeth 41 formed on the outer periphery of the first rotation member 30, that is, the outer periphery of the outer cylindrical portion 35. The first engaging teeth 41 are provided over an entire outer periphery of the outer cylindrical portion 35.

Figure 10:
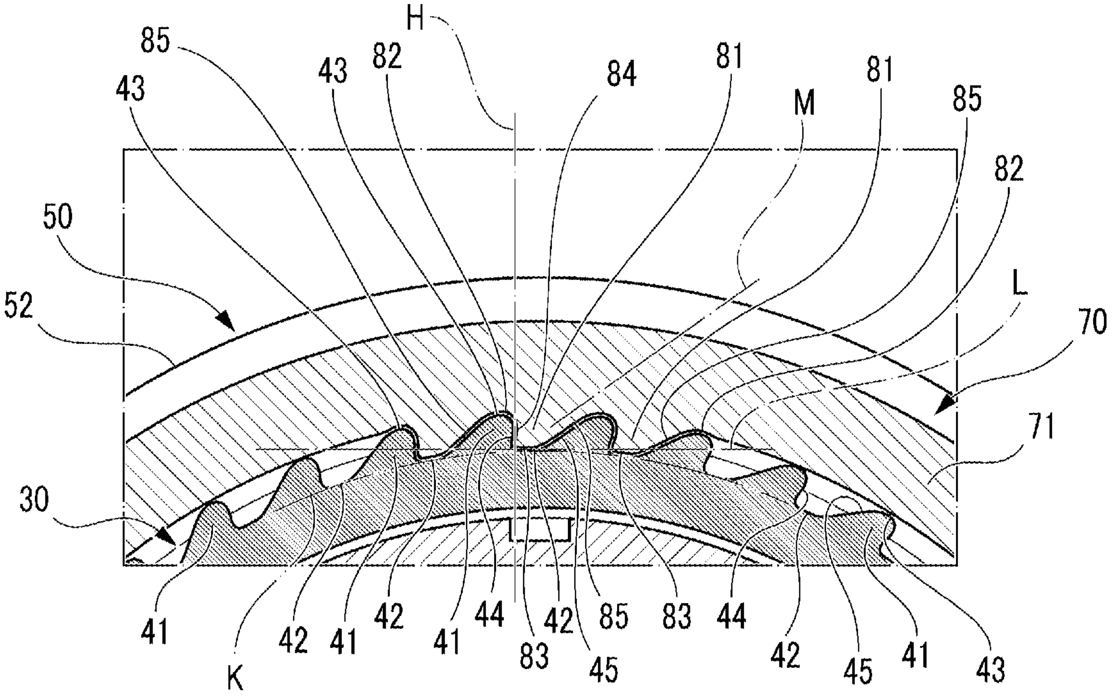
FIG. 10 is an enlarged view of a portion D in FIG. 8.

Referring also to FIG. 10, each of the first engaging teeth 41 includes a top portion 43 protruding highest from a bottom portion 42 (outer periphery of the outer cylindrical portion 35) toward an outside in the radial direction of the first rotation member 30.

One side surface of each of the first engaging teeth 41 on a side in a predetermined rotation direction of the first rotation member 30 forms an engaging surface 44 that engages with the second engaging portion 80 provided on the swing rotation member 70. Here, the engaging surface 44 engages with an engaging surface 84 of each of second engaging teeth 81 constituting the second engaging portion 80 (see FIG. 10).

The predetermined rotation direction of the first rotation member 30 means a direction in which the second member 6 rotates in the R1 direction with respect to the first member 1, the swing rotation member 70 swings in a direction (swings in the Y1 direction) in which the second engaging portion 80 engages with the first engaging portion 40, and the first rotation member 30 rotates integrally with the swing rotation member 70.

Further, the engaging surface 44 has a shape engageable in the radial direction of the first rotation member 30. The engaging surface 44 is engaged with the engaging surface 84 of each of the second engaging teeth 81 by a predetermined area in the radial direction of the first rotation member 30, and is shaped such that an engagement state between the two engaging surfaces 44, 84 can be maintained without the two engaging surfaces 44, 84 shifting radially outward or inward of the first rotation member 30.

Further, the engaging surface 44 is formed to be inclined at an angle at which the engaging surface 44 can be engaged in the radial direction with respect to a normal line H orthogonal to a tangent line L to a rotation trajectory K of the second rotation member 15 rotating with respect to the braking member 11.

In addition, the other side surface of each of the first engaging teeth 41 on a side opposite to the predetermined rotation direction of the first rotation member 30 is a tapered surface 45 that is inclined so as to gradually widen the first engaging tooth 41 from the top portion 43 toward the bottom portion 42 and toward the predetermined rotation direction of the first rotation member 30.

Figure 11:
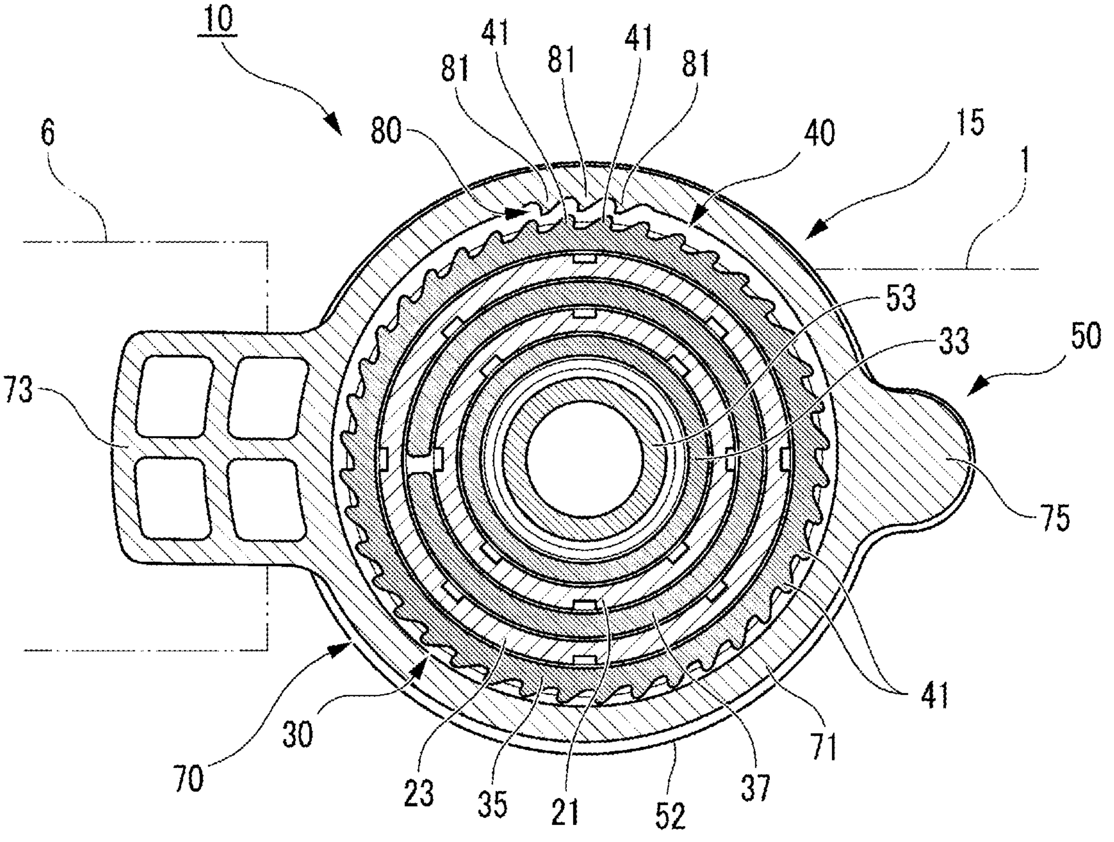
FIG. 11 is a cross-sectional view taken along the line A-A in FIG. 4 and illustrating a case of becoming from the state in FIG. 8 to a state in which no braking force is applied in the rotation braking device.
Figure 12:
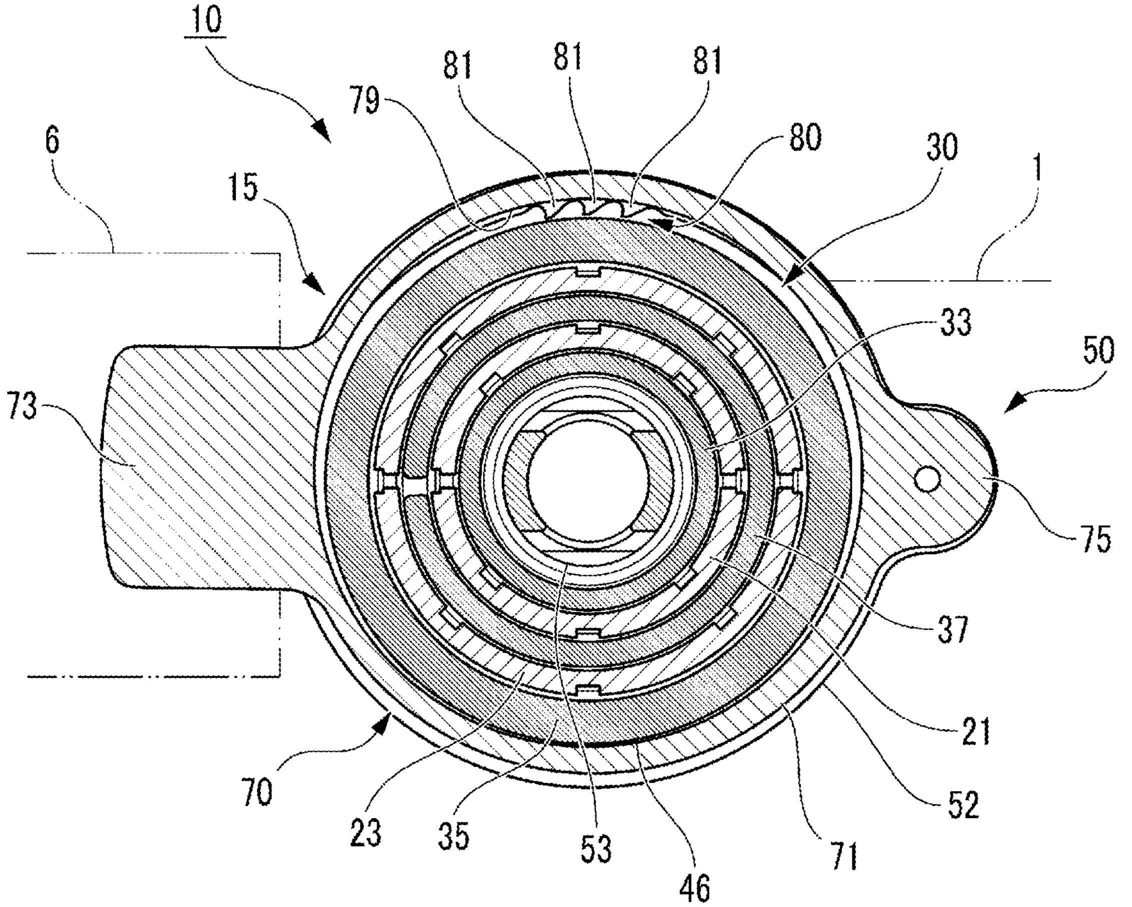
FIG. 12 is a cross-sectional view taken along the line B-B in FIG. 4 in the state of FIG. 11.

Further, in this embodiment, the abutment portion 46 that abuts against the inner periphery of the swing rotation member 70 as shown in FIGS. 12 and 14 when the swing rotation member 70 idles with respect to the first rotation member 30 (see FIGS. 11 to 14) is provided on the outer periphery of the first rotation member 30. Further, a configuration is adopted in which when the swing rotation member 70 idles with respect to the first rotation member 30, the abutment portion 46 abuts against the inner periphery of the swing rotation member 70 (here, an inner periphery of an annular wall portion 71 to be described later) (see FIGS. 12 and 14) to restrict the first engaging portion 40 from abutting against the inner periphery of the swing rotation member 70 (see FIGS. 11 and 13).

In FIGS. 11 and 13, although it appears that there are some points where the top portion 43 of the first engaging tooth 41 constituting the first engaging portion 40 abuts against the inner periphery of the swing rotation member 70, this is due to thickness of a line segment described in the drawing, and in reality, the first engaging portion 40 does not abut against the inner periphery of the swing rotation member 70.

When the abutment portion 46 abuts against the inner periphery of the swing rotation member 70 (see FIGS. 12 and 14), the first engaging portion 40 and the second engaging portion 80 are held in a separated state (see FIGS. 11 and 13).

In this embodiment, the abutment portion 46 having a thin annular protrusion shape protrudes over the entire outer periphery of the outer cylindrical portion 35 from a position on the outer periphery of the outer cylindrical portion 35, the position being adjacent to the first engaging portion 40 in the axial direction and being close to the tip end portion of the outer cylindrical portion 35 in the extension direction. Further, the abutment portion 46 protrudes higher radially outward of the first rotation member 30 than the top portion 43 of each of the first engaging teeth 41 constituting the first engagement portion 40 (a radially outward protrusion amount of the abutment portion 46 is greater than a radially outward protrusion amount of the first engaging portion 40).

Therefore, when the swing rotation member 70 idles with respect to the first rotation member 30, as shown in FIGS. 12 and 14, the abutment portion 46 abuts against the inner periphery of the swing rotation member 70 (inner periphery of the annular wall portion 71), the first engaging portion 40 is restricted from abutting against the inner periphery of the swing rotation member 70, and the first engaging portion 40 and the second engaging portion 80 are held in the separated state (see FIGS. 11 and 13).

A plurality of ridge portions 47 extending in the axial direction of the braking member 11 are provided at equal intervals in the circumferential direction from an outer periphery of the tip end portion of the outer cylindrical portion 35 in the extension direction. Further, a locking protruding portion 48 protrudes from an outer surface of a tip end portion of each of the ridge portions 47 in the extension direction. As shown in FIGS. 2 and 5, each of the locking protruding portions 48 is locked to a peripheral edge portion of a peripheral wall portion 61 of the second case 60 constituting the second rotation member 15, and holds the second case 60 so as not to be separated from the first case 50.

Next, the second rotation member 15 will be described with reference to FIGS. 1 and 5. As described above, the second rotation member 15 in the present embodiment includes the first case 50 and the second case 60 disposed to face the first case 50.

The first case 50 in this embodiment includes a bottom portion 51 having a substantially annular plate shape, a peripheral wall portion 52 having a substantially annular shape erected from an outer peripheral edge portion of the bottom portion 51, and a substantially cylindrical rotation shaft portion 53 extending from an inner peripheral edge portion of the bottom portion 51 by a predetermined length.

The rotation shaft portion 53 includes a base portion 54 having a substantially cylindrical shape, a pair of bendable pieces 55, 55 extending from a tip end portion of the base portion 54 in an extension direction thereof in a bifurcated manner, and claw portions 56 protruding from outer surfaces of tip end portions of the bendable pieces 55 in the extension direction. Further, the support shaft 9 (see FIG. 15) that rotatably supports the pair of members 1, 6 is inserted into an inner periphery of the rotation shaft portion 53.

Further, the rotation shaft portion 53 is inserted into the inner cylindrical portion 33 of the first rotation member 30 constituting the braking member 11 while bending and deforming the bendable pieces 55, and the claw portions 56, 56 got out from a tip end opening of the inner cylindrical portion 33 is locked to a tip end surface of the tip end portion **33*a* of the inner cylindrical portion 33 (see FIG. 5), whereby the first case 50 is held with respect to the braking member 11, and therefore the entire second rotation member 15 is held with respect to the braking member 11 in an anti-come-off state, and the second rotation member 15 is rotatably mounted on the first rotation member 30**.

That is, in this embodiment, the first rotation member 30 and the second rotation member 15 are supported so as to be relatively rotatable by the inner cylindrical portion 33 of the first rotation member 30 and the rotation shaft portion 53 provided in the first case 50 constituting the second rotation member 15.

Incidentally, as described above, the coupling member 20 and the first rotation member 30 are rotatably supported by both the cylindrical portions 21, 23 of the coupling member 20 and the cylindrical portions 33, 35, 37 of the first rotation member 30, but these cylindrical portions 21, 23, 33, 35, 37 and the rotation shaft portion 53 are disposed coaxially (rotation axes thereof are the same). The rotation axes of these portions are the same as a rotation axis of the support shaft 9 that rotatably supports the pair of members 1, 6.

That is, both the cylindrical portions 21, 23 of the coupling member 20, the cylindrical portions 33, 35, 37 of the first rotation member 30, and the rotation shaft portion 53 of the first case 50 constitute the "rotation support portion" in the present invention.

Further, a bulging portion 57 bulging from an outer periphery of the peripheral wall portion 52 is provided at a predetermined position of the peripheral wall portion 52 in the circumferential direction. An eccentric shaft support portion 58 having a circular hole shape is formed at a corresponding position of the bulging portion 57 and the peripheral wall portion 52.

On the other hand, the second case 60 includes the peripheral wall portion 61 having a substantially annular shape adapted to the peripheral wall portion 52 of the first case 50, and is provided with a bulging portion 62 that bulges from an outer periphery of the peripheral wall portion 61 at a predetermined position of the peripheral wall portion 61 in the circumferential direction. An eccentric shaft support portion 63 having a circular hole shape is formed at a corresponding position of the bulging portion 62 and the peripheral wall portion 61.

Next, the swing rotation member 70 will be described with reference to FIGS. 1, 3, and 5 to 7, and the like.

The swing rotation member 70 swings in a predetermined direction with respect to the second rotation member 15 via the swing support portion. Further, when the other member (second member 6) rotates with respect to the one member (first member 1), the swing rotation member 70 rotates and swings following the rotation of the second member 6 via the pair of coupled portions 8, 8 and the coupling protruding portion 73.

The swing rotation member 70 in this embodiment includes the annular wall portion 71 having a substantially annular shape, the coupling protruding portion 73 protruding from an outer periphery of a predetermined position of the annular wall portion 71 in a circumferential direction, a bulging portion 75 bulging from an outer periphery of the annular wall portion 71 at a position opposite to the coupling protruding portion 73 in the circumferential direction of the annular wall portion 71, and a pair of eccentric shafts 76, 77 coaxially protruding from both end surfaces in a thickness direction thereof at corresponding positions of the bulging portion 75 and the annular wall portion 71.

When the coupling protruding portion 73 is inserted between the pair of coupled portions 8, 8 of the second member 6, the swing rotation member 70 is coupled to the second member 6, which is the other member.

The eccentric shaft 76 protrudes from one end surface (end surface facing the first case 50) of the bulging portion 75 in the thickness direction, and the eccentric shaft 77 protrudes from the other end surface (end surface facing the second case 60) of the bulging portion 75 in the thickness direction.

Further, as shown in FIG. 5, the eccentric shaft 76 is inserted into the eccentric shaft support portion 58 of the first case 50, and the eccentric shaft 77 is inserted into the eccentric shaft support portion 63 of the second case 60, so that the swing rotation member 70 is swingably supported with respect to the second rotation member 15 in a state of being sandwiched between the first case 50 and the second case 60.

That is, the eccentric shaft support portions 58, 63 of the second rotation member 15 and the eccentric shafts 76, 77 of the swing rotation member 70 constitute the "swing support portion" in the present invention. Further, an axis of the swing support portion does not coincide with a rotation axis of the rotation support portion, and is shifted (eccentric) radially outward of the first rotation member 30 or the second rotation member 15. Further, the swing support portion is disposed outside the first rotation member 30.

Figure 3:
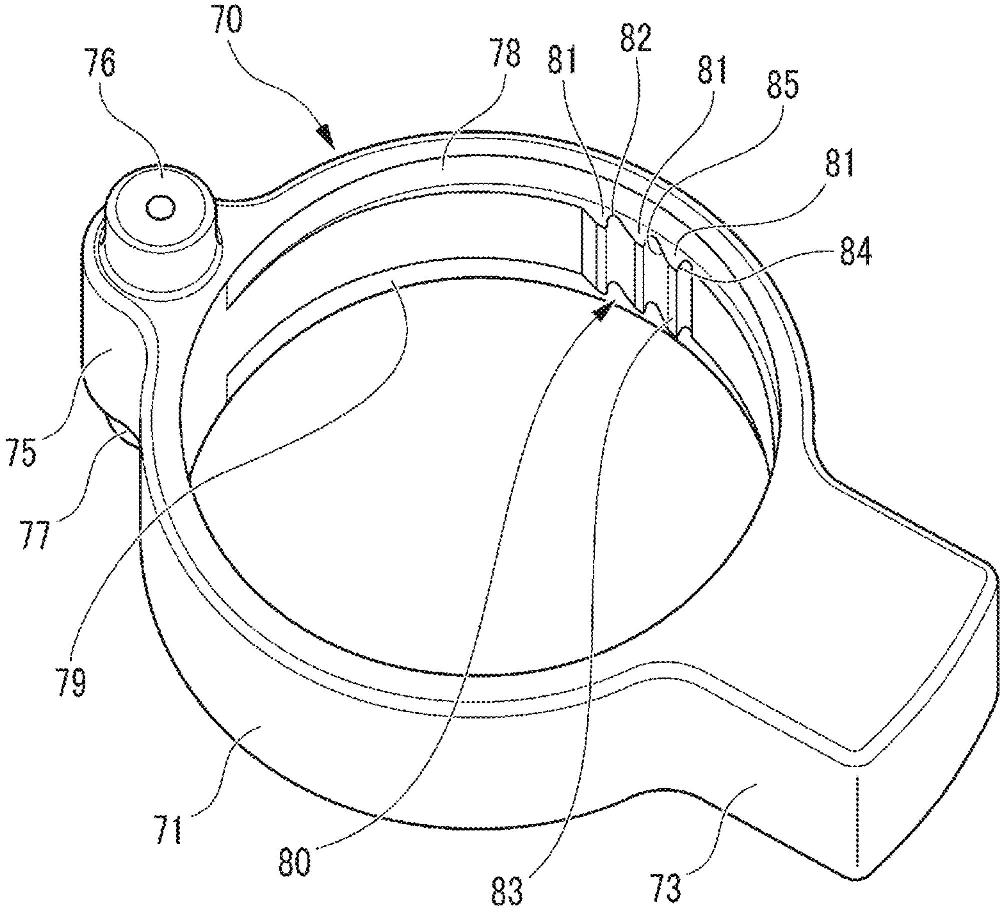
FIG. 3 is an enlarged perspective view of a swing rotation member forming the rotation braking device as viewed from a direction different from that in FIG. 1.
Figure 4:
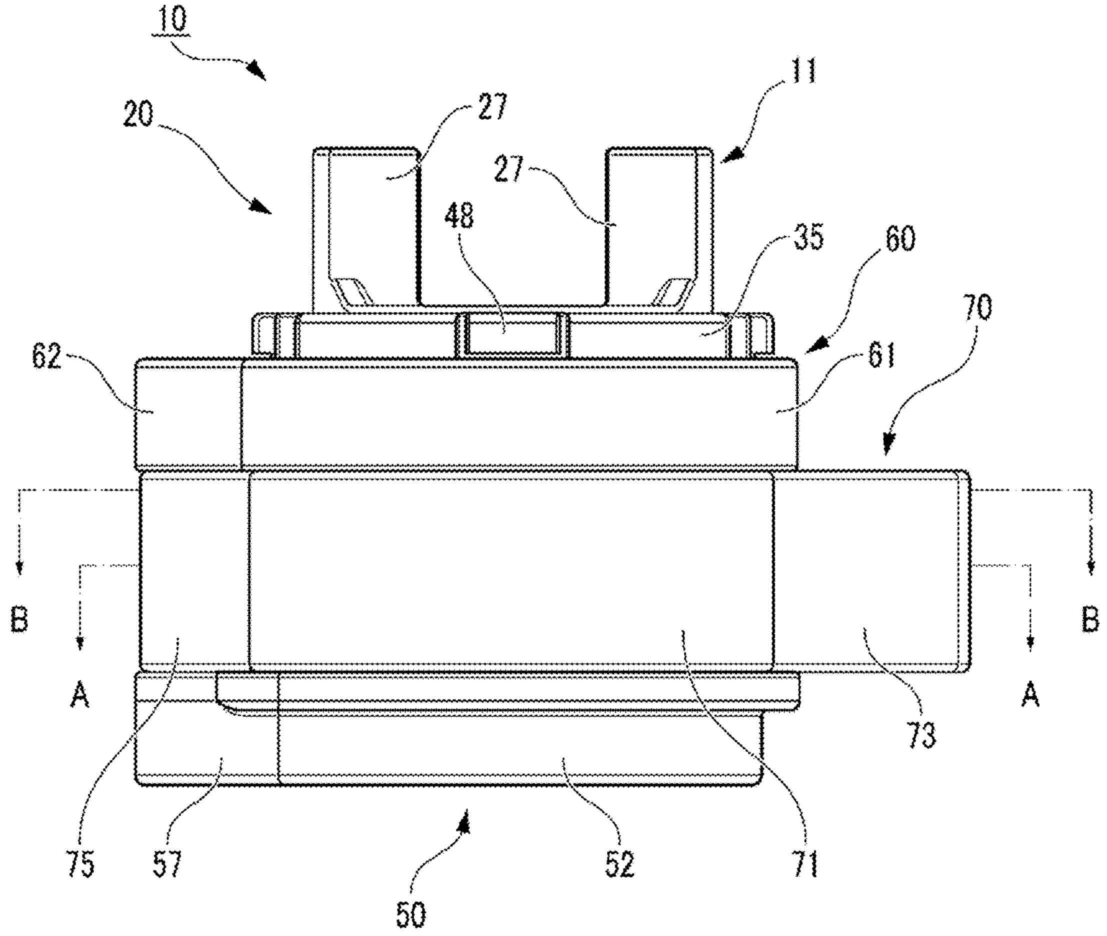
FIG. 4 is a front view of the rotation braking device.

As shown in FIG. 3, in a predetermined range in the circumferential direction on the inner periphery of the annular wall portion 71 (here, an inner periphery between the coupling protruding portion 73 and the eccentric shafts 76, 77 and one side in the circumferential direction of the annular wall portion 71), both end portions in the axial direction thereof (both end portions of the annular wall portion 71 in the extension direction) are formed with hollowed portions 78, 79 hollowed by a predetermined depth deeper than other portions. The hollowed portion 78 is located on a first case 50 side, and the hollowed portion 79 is located on a second case 60 side.

In addition, in a state in which the swing rotation member 70 is disposed on the outer periphery of the first rotation member 30, the abutment portion 46 provided in the first rotation member 30 enters the hollowed portion 79 located on the second case 60 side of the swing rotation member 70. Further, when the swing rotation member 70 idles with respect to the first rotation member 30, as shown in FIGS. 12 and 14, the abutment portion 46 abuts against an inner periphery of the annular wall portion 71 of the swing rotation member 70 on a side opposite to the hollowed portion 79 in the circumferential direction. As a result, the first engaging portion 40 is restricted from abutting against the inner periphery of the swing rotation member 70, and the first engaging portion 40 and the second engaging portion 80 are held in the separated state (see FIGS. 11 and 13).

Figure 7:
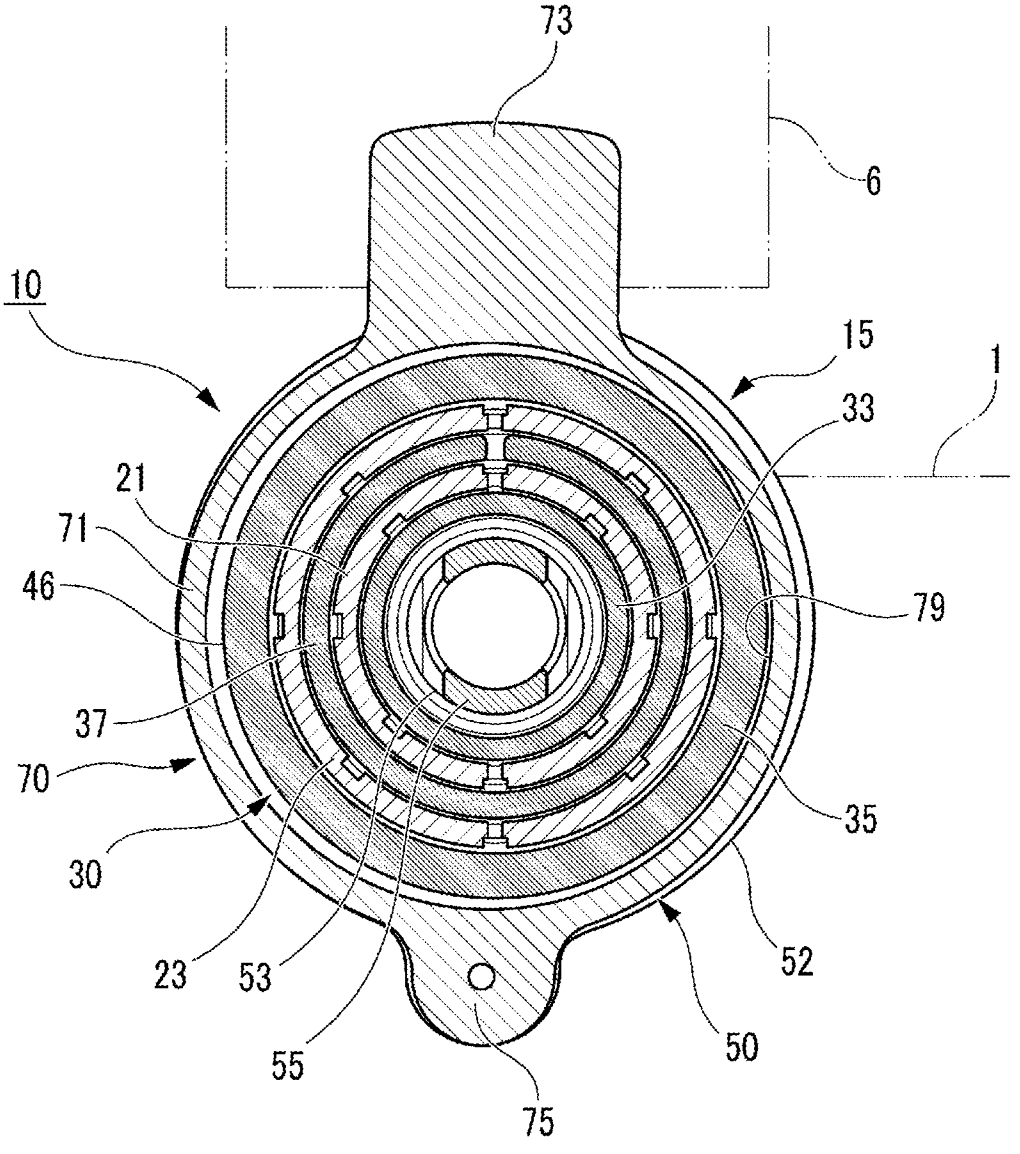
FIG. 7 FIO. 7 is a cross-sectional view taken along a line B-B in FIG. 4 in the state of FIG. 6.

Further, in the above state, as shown in FIG. 7, the abutment portion 46 of the first rotation member 30 does not abut against the inner periphery of the annular wall portion 71 of the swing rotation member 70 and is separated therefrom.

Further, as shown in FIG. 3, the second engaging portion 80 including the plurality of second engaging teeth 81 that engage with the plurality of first engaging teeth 41 constituting the first engaging portion 40 in the connectable and separable manner, is provided on the inner periphery of the swing rotation member 70.

In this embodiment the plurality of second engaging teeth 81 are provided on the inner periphery of the annular wall portion 71 in a manner of being located between the pair of hollowed portions 78, 79 in the axial direction and between the coupling protruding portion 73 and the eccentric shafts 76, 77 in the circumferential direction. In this embodiment, three second engaging teeth 81 protrude along the inner periphery of the annular wall portion 71.

Referring also to FIG. 10, each of the second engaging teeth 81 includes a top portion 83 that protrudes highest from a bottom portion 82 (inner periphery of the annular wall portion 71) toward an inside in the radial direction of the swing rotation member 70.

One side surface of each of the second engaging teeth 81 on a side in the predetermined swing direction Y1 of the swing rotation member 70 forms the engaging surface 84 that engages with the first engaging portion 40 provided in the first rotation member 30. Here, the engaging surface 84 engages with the engaging surface 44 of the first engaging tooth 41 constituting the first engaging portion 40 (see FIG. 10).

Further, the engaging surface 84 has a shape engageable in the radial direction of the first rotation member 30. The engaging surface 84 is engaged with the engaging surface 44 of each of the first engaging teeth 41 by the predetermined area in the radial direction of the first rotation member 30, and is shaped such that an engagement state between the two engaging surfaces 44, 84 can be maintained without the two engaging surfaces 44, 84 shifting radially outward or inward of the first rotation member 30.

Further, the engaging surface 84 is formed to be inclined at an angle at which the engaging surface 84 can be engaged in the radial direction with respect to the normal line H orthogonal to the tangent line L to the rotation trajectory K of the second rotation member 15 rotating with respect to the braking member 11.

Further, the other side surface of each of the second engaging teeth 81 on a side opposite to the swing direction Y1 of the swing rotation member 70 has a tapered surface shape inclined so as to gradually widen the second engaging teeth 81 from the top portion 83 toward the bottom portion 82 and toward the swing direction Y2 of the swing rotation member 70.

Next, an operation of the rotation braking device 10 having the above structure will be described.

FIGS. 13 and 14 illustrate a state in which the second member 6 is opened from the opening portion 4 of the first member 1 when the second member 6 is rotated in the R2 direction with respect to the first member 1, that is, when the second member 6 is gripped and lifted by a hand, and the second member 6 is disposed orthogonal to a surface direction of the first member 1.

In this state, the abutment portion 46 of the first rotation member 30 abuts against the inner periphery of the swing rotation member 70 (inner periphery of the annular wall portion 71) (see FIG. 14), the first engaging portion 40 is restricted from abutting against the inner periphery of the swing rotation member 70, and the first engaging portion 40 and the second engaging portion 80 are held in the separated state (see FIG. 13).

When the hand is released from the second member 6 in the above state, the second member 6 approaches the first member 1 by an own weight or the like and rotates in a direction of closing the opening portion 4, that is, rotates in the R1 direction. By this, following the rotation of the second member 6, the swing rotation member 70 swings in the Y1 direction with respect to the second rotation member 15 via the swing support portion. Accordingly, as shown in FIG. 6, the second engaging portion 80 of the swing rotation member 70 engages with the first engaging portion 40 of the first rotation member 30.

In this state, the plurality of first engaging teeth 41 of the first engaging portion 40 of the first rotation member 30 and the plurality of second engaging teeth 81 of the second engaging portion 80 of the swing rotation member 70 are engaged with each other Specifically, as shown in FIG. 10, the engaging surface 84 of the corresponding second engaging tooth 81 is engaged with the engaging surface 44 of the first engaging tooth 41, and the tapered surface 85 of the corresponding second engaging tooth 81 is disposed in a manner of facing the tapered surface 45 of the first engaging tooth 41.

Further, in the above state, as shown in FIG. 7, the abutment portion 46 of the first rotation member 30 does not abut against the inner periphery of the annular wall portion 71 of the swing rotation member 70 and is separated therefrom.

Further, when the second engaging portion 80 and the first engaging portion 40 engage with each other as described above, the first rotation member 30 and the swing rotation member 70 integrally rotate in the same rotation direction as the rotation direction R1 of the second member 6 as shown in FIGS. 8 and 9. As a result, since the first rotation member 30 rotates in the same direction as the rotation direction R1 of the second member 6 with respect to the coupling member 20 coupled and fixed to the first member 1, the braking force of the braking member 11 is generated, and the second member 6 can be braked.

Next, from a state in which the opening portion 4 of the first member 1 is closed by the second member 6 and a surface direction of the second member 6 is horizontal, the second member 6 is gripped and lifted, and as shown in FIGS. 8 and 9, the second member 6 is rotated in the R2 direction opposite to the R1 direction with respect to the first member 1.

By this, following the rotation of the second member 6, the swing rotation member 70 swings in the Y2 direction with respect to the second rotation member 15 via the swing support portion. That is, the swing direction of the swing rotation member 70 with respect to the second rotation member 15 changes from the Y1 direction to the Y2 direction (the swing direction switches).

As a result, as shown in FIG. 11, the plurality of second engaging teeth 81 of the second engaging portion 80 of the swing rotation member 70 are separated from the plurality of first engaging teeth 41 of the first engaging portion 40 of the first rotation member 30, and the engagement between the first engaging portion 40 and the second engaging portion 80 is released.

The abutment portion 46 of the first rotation member 30 abuts against the inner periphery of the annular wall portion 71 of the swing rotation member 70 (see FIG. 12), the first engaging portion 40 is restricted from abutting against the inner periphery of the swing rotation member 70, and the first engaging portion 40 and the second engaging portion 80 are held in the separated state (see FIG. 13).

Therefore, when the second member 6 is further lifted upward and rotated with respect to the first member 1, the swing rotation member 70 idles with respect to the first rotation member 30. Therefore, as shown in FIGS. 13 and 14, even when the second member 6 is rotated with respect to the first member 1 until the second member 6 is disposed orthogonal to the surface direction of the first member 1, the second member 6 can be rotated in a state in which the braking force of the braking member 11 does not act.

When the hand is released from the second member 6 in this state, the second member 6 rotates in the R1 direction, the swing rotation member 70 swings in the Y1 direction with respect to the second rotation member 15 via the swing support portion, and the swing direction of the swing rotation member 70 with respect to the second rotation member 15 changes (switches) from the Y2 direction to the Y1 direction again, similarly to the above description. The subsequent operation is the same as those as above.

Modification

Shapes, structures, layouts, and the like of the braking member (coupling member and first rotation member), the second rotation member, the swing rotation member, the seal ring, and the like constituting the rotation braking device in the present invention are not limited to the above-described aspects.

The braking member 11 in this embodiment uses viscous resistance of a viscous fluid or the like, but may use, for example, a frictional force (friction).

In the case of the rotation braking device 10 according to this embodiment, when the second member 6 approaches the first member 1 (when the opening portion 4 of the first member 1 is closed), a braking force is applied to the second member 6 to cause the second member 6 to slowly approach the first member 1 (slowly close the opening portion 4), but for example, the rotation braking device 10 may be used in a rotation structure of a free stop hinge in which a braking force is applied when both members rotate so that a second member can be maintained in a state of being stationary (stopped) at a predetermined angle with respect to a horizontal direction.

In addition, the rotation support portion in this embodiment includes the both cylindrical portions 21, 23 of the coupling member 20, the cylindrical portions 33, 35, 37 of the first rotation member 30, and the rotation shaft portion 53 of the first case 50, and is formed of a multi-cylinder structure and a shaft portion, but may be, for example, a combination of a shaft portion and a shaft support hole, or a combination of a cylindrical portion, a shaft portion, a shaft support hole, and the like.

Further, the swing support portion in this embodiment includes the hole-shaped eccentric shaft support portions 58, 63 provided in the respective cases 50, 60 and the eccentric shafts 76, 77 provided in the swing rotation member 70, but for example, an eccentric shaft may be provided on a case side and a support hole may be provided on a swing rotation member side.

In addition, the second rotation member 15 in this embodiment includes a two-part configuration of the first case 50 and the second case 60, but the second rotation member may be a single part or three or more parts.

Further, the swing rotation member 70 in this embodiment is disposed on the outer periphery of the first rotation member 30, but the swing rotation member may be disposed on an inner periphery of the first rotation member (this will be described later in a third embodiment).

In addition, in this embodiment, when the braking member 11 and the swing rotation member 70 are viewed from the axial direction, the swing support portion is disposed outside the first rotation member 30, but the swing support portion may be disposed inside the first rotation member (this will be described later in the third embodiment).

Furthermore, in this embodiment, the abutment portion 46 protrudes from the outer periphery of the first rotation member 30, but the abutment portion may protrude from the inner periphery of the swing rotation member (this will be described later in a second embodiment), may protrude from an outer periphery of the swing rotation member (this will be described later in the third embodiment), may protrude from the inner periphery of the first rotation member (this will be described later in a fourth embodiment), or may be configured such that the first engaging portion does not abut against the inner periphery of the swing rotation member.

In addition, in this embodiment, the engaging surface 44 of each of the first engaging teeth 41 constituting the first engaging portion 40 and the engaging surface 84 of each of the second engaging teeth 81 constituting the second engaging portion 80 have the shape engageable in the radial direction of the first rotation member 30, but the engaging surface may be formed to coincide with the normal line H orthogonal to the tangent line L to the rotation trajectory K of the second rotation member 15 (it can be said that the engaging surface is formed to be a vertical surface orthogonal a tangent line to the bottom portion of the first engaging tooth or the bottom portion of the second engaging tooth).

Further, each engaging surface may have a shape along a line segment M (see FIG. 10) forming an acute angle with respect to the tangent line L to the rotation trajectory K of the second rotation member 15. That is, when the swing rotation member swings, both the engaging portions are engaged with each other, and a pressing force from the other engaging surface acts on one engaging surface, the other engaging surface may be shaped to engage with the one engaging surface by sinking (being depressed) radially inward, making it difficult for the other engaging surface to come off radially outward.

Further, the number of the second engaging teeth 81 constituting the second engaging portion 80 according to this embodiment is three, but the number of the second engaging teeth may be two, four or more, or one.

Operations and Effects

Next, operations and effects of the rotation braking device 10 configured as described above will be described.

That is, in order to open the opening portion 4 from the state in which the opening portion 4 of the first member 1 is closed by the second member 6, as shown in FIGS. 8 and 9, the second member 6 is rotated in the R2 direction opposite to the R1 direction with respect to the first member 1.

By this, the swing rotation member 70 swings in the Y2 direction with respect to the second rotation member 15, the second engaging portion 80 of the swing rotation member 70 is separated from the first engaging portion 40 of the first rotation member 30 (see FIG. 11), the abutment portion 46 of the first rotation member 30 abuts against the inner periphery of the annular wall portion 71 of the swing rotation member 70 (see FIG. 12), the first engaging portion 40 and the second engaging portion 80 are held in the separated state, and the swing rotation member 70 idles with respect to the first rotation member 30.

Therefore, the second member 6 can be smoothly rotated with respect to the first member 1 with a small force without receiving the braking force of the braking member 11, and the opening portion 4 of the first member 1 can be quickly opened (see FIGS. 13 and 14).

When the hand is released from the second member 6 in the state shown in FIGS. 13 and 14, the swing rotation member 70 swings in the Y1 direction with respect to the second rotation member 15 via the swing support portion, and the second engaging portion 80 of the swing rotation member 70 engages with the first engaging portion 40 of the first rotation member 30 as shown in FIG. 6.

By this, as shown in FIGS. 8 and 9, since the first rotation member 30 and the swing rotation member 70 rotate integrally, the first rotation member 30 rotates in the same direction as the rotation direction R1 of the second member 6 with respect to the coupling member 20 fixed to the first member 1, and the braking force of the braking member 11 is generated. As a result, the second member 6 can be braked and rotated slowly to close the opening portion 4 of the first member 1.

Therefore, it is possible to obtain the rotation braking device 10 (also referred to as an one-way rotation braking device or one-direction rotation braking device) that applies the braking force when the second member 6 rotates in the predetermined R1 direction with respect to the first member 1 (see FIGS. 6 to 10), and does not apply the braking force when the second member 6 rotates in the R2 direction opposite to the R1 direction with respect to the first member 1 (see FIGS. 11 to 14) in the pair of members 1, 6 that rotate relative to each other.

It is possible to obtain the rotation braking device 10 which is more compact than the one-direction braking device adopting the rack-and-pinion structure in Patent Literature 1 (JP4080921B) and in which each member is easily assembled.

Further, in this embodiment, the swing rotation member 70 is disposed on the outer periphery of the first rotation member 30, and the swing support portion is disposed outside the first rotation member 30.

According to the above aspect, since the swing rotation member 70 is disposed on the outer periphery of the first rotation member 30 and the swing support portion is disposed outside the first rotation member 30, an assembled state of the swing support portion can be visually recognized, and assemblability of each member can be further improved.

In addition, since the swing support portion is disposed outside the first rotation member 30, the swing support portion can be provided to be large, and play of the swing rotation member 70 with respect to the second rotation member 15 can be reduced.

Further, since the swing rotation member 70 is disposed on the outer periphery of the first rotation member 30 and the swing support portion is disposed outside the first rotation member 30, it is possible to ensure a long length between the swing support portion and both the engaging portions 40, 80, and as a result, it is possible to increase a size of the swing rotation member 70. Therefore, an engaging state and engagement release of both the engaging portions 40, 80 are quickly switched by the swing of the swing rotation member 70 with respect to the second rotation member 15, and thus the switching between the braking force application and the braking force release performed by the braking member 11 can be quickly performed.

In this embodiment, the outer periphery of the first rotation member 30 and the inner periphery of the swing rotation member 70 each have the circular shape, the abutment portion 46 that abuts against the inner periphery of the swing rotation member 70 when the swing rotation member 70 idles with respect to the first rotation member 30 is provided in a manner of protruding from the outer periphery of the first rotation member 30, the first engaging portion 40 is provided on the outer periphery of the first rotation member 30 at the position that is shifted in the axial direction with respect to the abutment portion 46, and the abutment portion 46 abuts against the inner periphery of the swing rotation member 70 when the swing rotation member 70 idles with respect to the first rotation member 30 (see FIGS. 12 and 14) to restrict the first engaging portion 40 from abutting against the inner periphery of the swing rotation member 70 (see FIGS. 11 and 13).

According to the above aspect, when the swing rotation member 70 idles with respect to the first rotation member 30, the first engaging portion 40 can be restricted from abutting against the inner periphery of the swing rotation member 70, so that the engagement between the first engaging portion 40 and the second engaging portion 80 can be reliably prevented, and when the other member (second member 6) is rotated in the R2 direction opposite to the predetermined R1 direction with respect to the one member (first member 1), the second member 6 can be smoothly operated with a small force (operability is improved), and a decrease in durability caused by the first engaging portion 40 abutting against the inner periphery of the swing rotation member 70 can be prevented.

Furthermore, in this embodiment, the first engaging portion 40 includes the plurality of first engaging teeth 41 formed on the outer periphery of the first rotation member 30, the second engaging portion 80 includes the plurality of second engaging teeth 81 that engage with the first engaging teeth 41 in the connectable and separable manner, and the engaging surfaces 44, 84 where the first engaging teeth 41 and the second engaging teeth 81 engage when the first rotation member 30 and the swing rotation member 70 rotate integrally have the shape engageable in the radial direction of the first rotation member 30.

According to the above aspect, the engaging surfaces 44, 84 where the first engaging teeth 41 and the second engaging teeth 81 engage when the first rotation member 30 and the swing rotation member 70 rotate integrally have the shape engageable in the radial direction of the first rotation member 30, and thus, even when a large load acts on the other member (second member 6), the first engaging portion 40 and the second engaging portion 80 can be stably engaged without being disengaged, and the braking force of the braking member 11 can be reliably exerted.

The above-described effects can also be similarly obtained in a case in which the engaging surfaces 44, 84 where the first engaging teeth 41 and the second engaging teeth 81 engage when the first rotation member 30 and the swing rotation member 70 integrally rotate are formed to coincide with the normal line H orthogonal to the tangent line L to the rotation trajectory K of the second rotation member 15 rotating with respect to the braking member 11.

Second Embodiment of Rotation Braking Device

Figure 16:
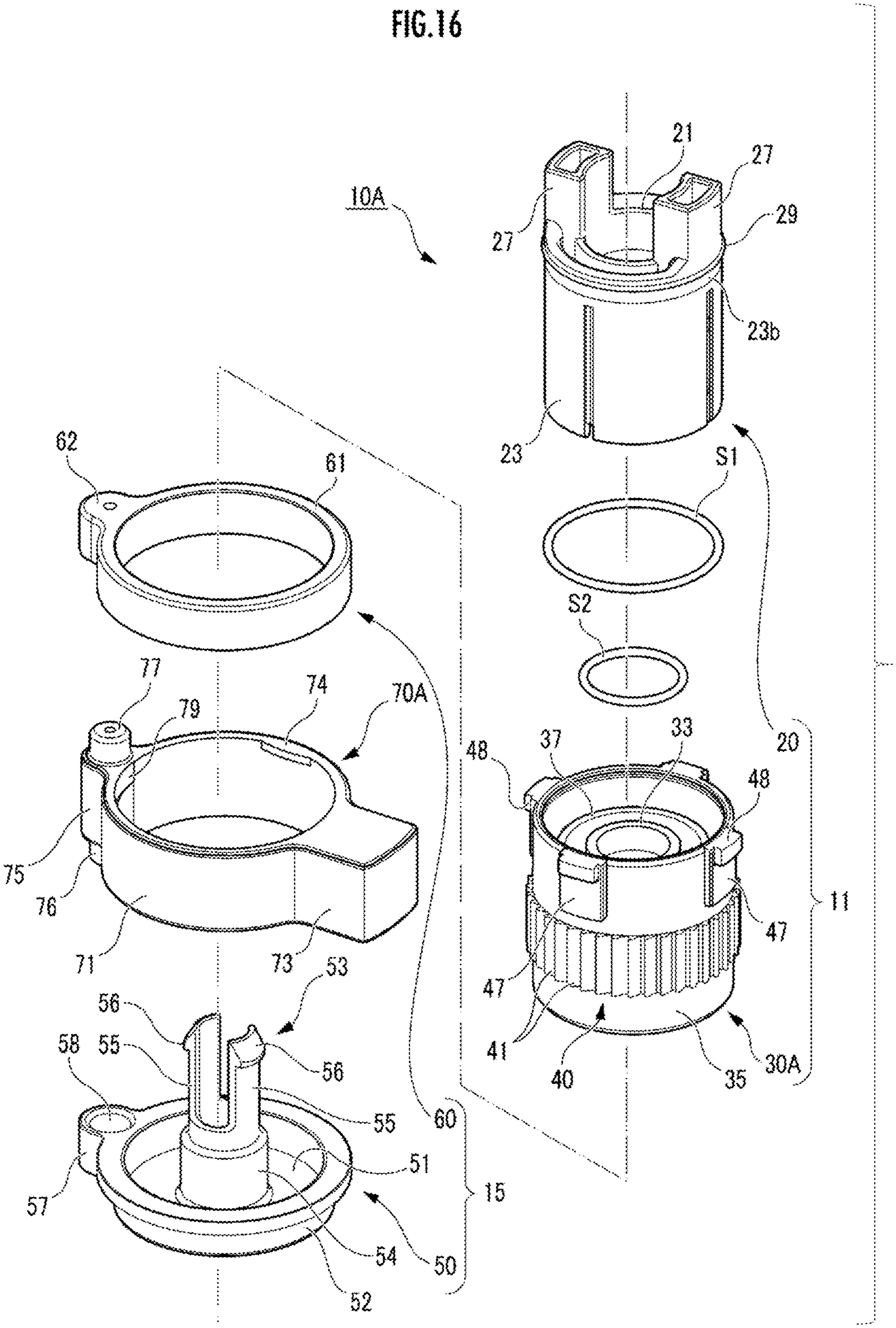
FIG. 16 is an exploded perspective view showing a rotation braking device according to a second embodiment of the present invention.
Figure 17:
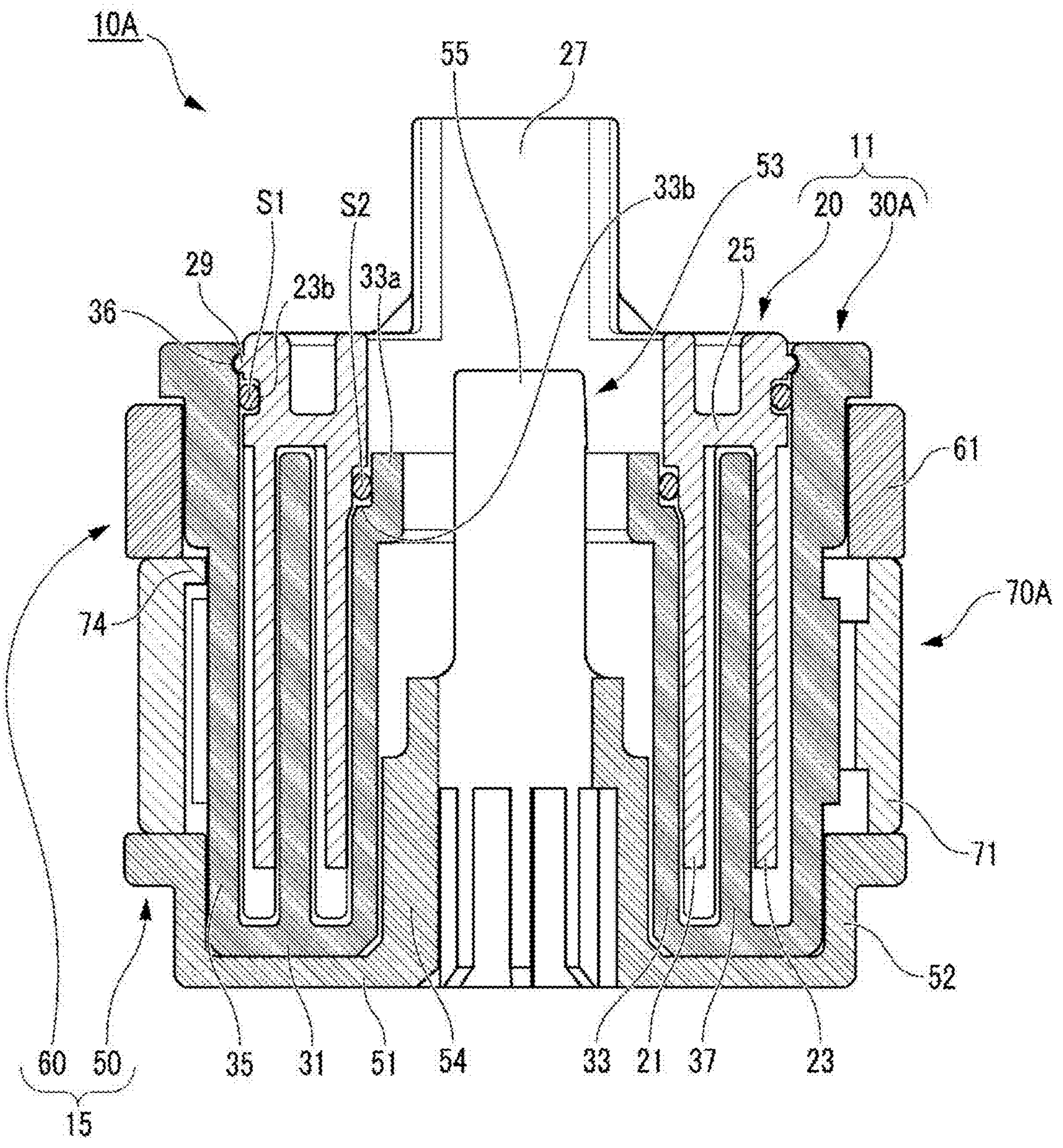
FIG. 17 is a cross-sectional view of the rotation braking device.
Figure 18:
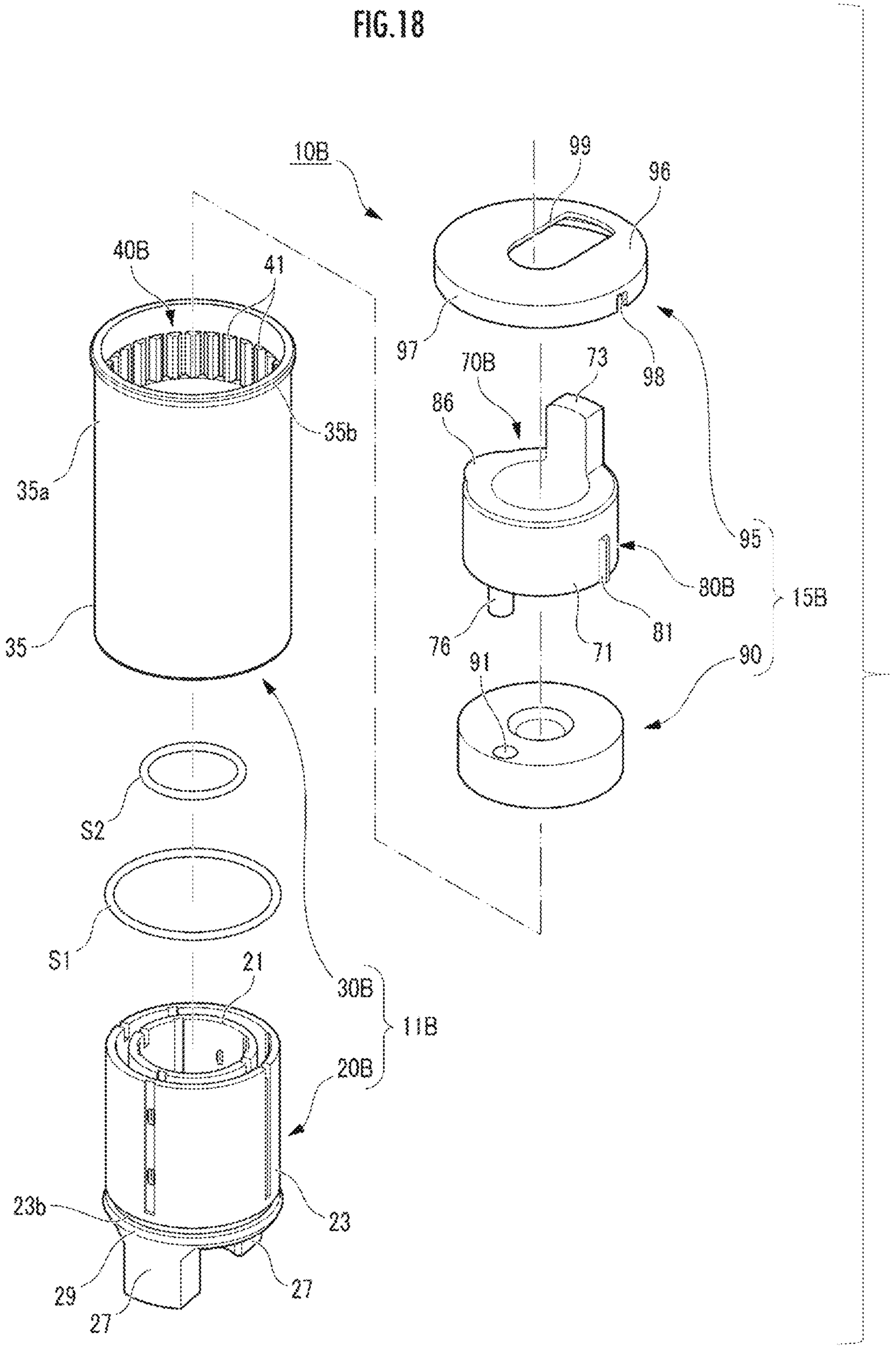
FIG. 18 is an exploded perspective view showing a rotation braking device according to a third embodiment of the present invention.
Figure 19:
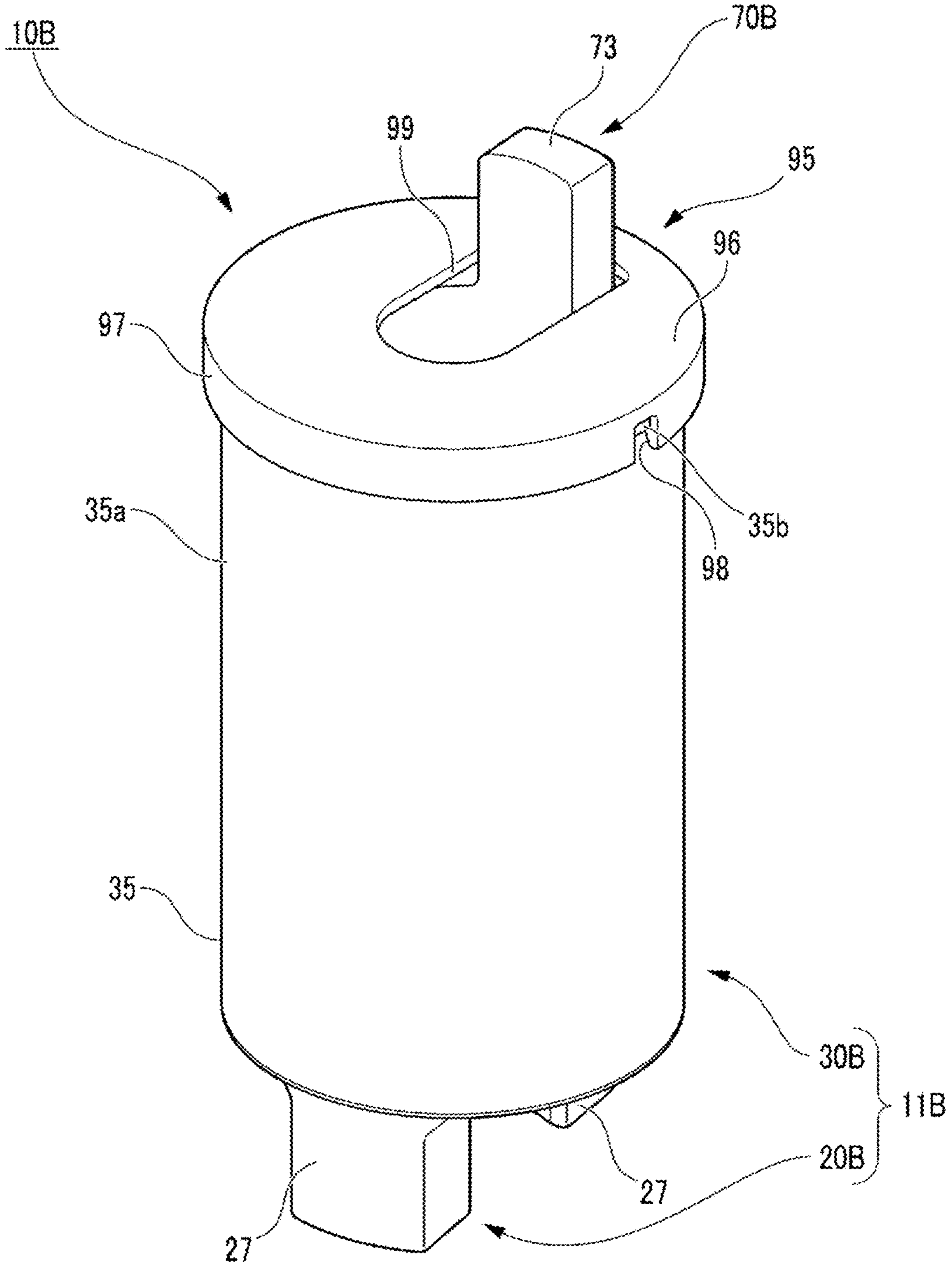
FIG. 19 is a perspective view of the rotation braking device.

A rotation braking device according to the second embodiment of the present invention is shown in FIGS. 16 and 17. The same reference signs are given to substantially the same parts as those in the above-described embodiments, and a description thereof will be omitted.

A rotation braking device 10A according to this embodiment basically has the same structure as that of the embodiment shown in FIGS. 1 to 15, but a formation position of an abutment portion is different from that of the embodiment shown in FIGS. 1 to 15.

That is, as illustrated in FIG. 16, a configuration is adopted in which an abutment portion 74 that abuts against an outer periphery of a first rotation member 30A when a swing rotation member 70A idles with respect to the first rotation member 30A is provided in a manner of protruding from an inner periphery of the swing rotation member 70A, and the abutment portion 74 abuts against the outer periphery of the first rotation member 30A during the idling of the swing rotation member 70A with respect to the first rotation member 30A to restrict the first engaging portion 40 from abutting against the inner periphery of the swing rotation member 70A.

The abutment portion 74 in this embodiment is provided in a manner of extending with a predetermined width in a circumferential direction so as to be located at the other end portion (end portion on a second case 60 side) in an axial direction on an inner periphery of the annular wall portion 71 constituting the swing rotation member 70A and to be located between the coupling protruding portion 73 and the eccentric shaft 77 in the circumferential direction.

As shown in FIG. 17, the abutment portion 74 is disposed in a manner of facing the outer periphery of the first rotation member 30A (outer periphery of the outer cylindrical portion 35) in a state of being disposed on the outer periphery of the first rotation member 30A.

On the other hand, the outer periphery of the first rotation member 30A, that is, the outer periphery of the outer cylindrical portion 35 is not provided with the abutment portion 46 in the above embodiment.

In this embodiment, when the swing rotation member 70A idles with respect to the first rotation member 30A, the abutment portion 74 can abut against the outer periphery of the first rotation member 30A to restrict the first engaging portion 40 from abutting against the inner periphery of the swing rotation member 70A, so that engagement between the first engaging portion 40 and the second engaging portion 80 can be reliably prevented, the second member 6 can be smoothly operated with a small force when the second member 6 is rotated in the R2 direction, and a decrease in durability caused by the first engaging portion 40 abutting against the inner periphery of the swing rotation member 70A can be prevented.

Third Embodiment of Rotation Braking Device

A rotation braking device according to the third embodiment of the present invention is shown in FIGS. 18 to 21. The same reference signs are given to substantially the same parts as those in the above-described embodiments, and a description thereof will be omitted.

A rotation braking device 10B according to this embodiment is different from the embodiments shown in FIGS. 1 to 17 in a length in an axial direction of a first rotation member 30B constituting a braking member 11B, shapes of a second rotation member 15B and a swing rotation member 70B, and the like. When the braking member 11B and the swing rotation member 70B are viewed from the axial direction, at least the swing rotation member 70B is disposed on an inner periphery of 30B of the first rotation member 30B (it can also be said that at least a part of the swing rotation member 70B is disposed on the inner periphery of the first rotation member 30B), and a swing support portion is disposed inside the first rotation member 30B. In this embodiment, a portion of the swing rotation member 70B excluding the coupling protruding portion 73 is disposed on the inner periphery of the first rotation member 30B (see FIG. 19).

The second rotation member 15B includes a support member 90 that supports the swing rotation member 70B, and a lid member 95.

The support member 90 has a thick annular block shape, and an eccentric shaft support portion 91 having a circular hole shape is formed at a predetermined position in a circumferential direction thereof.

In addition, the lid member 95 includes a top plate 96 having a substantially circular plate shape, a peripheral wall 97 vertically provided from a peripheral edge of the top plate 96, a locking portion 98 having an annular protrusion shape protruding from an inner periphery of an end portion of the peripheral wall 97, and a coupling protruding portion insertion hole 99 formed in the top plate 96. The lid member 95 holds the support member 90 and the swing rotation member 70B so as to prevent the support member 90 and the swing rotation member 70B from coming off from an opening portion on the other end side in the axial direction of the first rotation member 30B.

Further the swing rotation member 70B includes the annular wall portion 71 extending with a predetermined length, and the coupling protruding portion 73 protrudes from a predetermined position in a circumferential direction on one end surface (end surface on a lid member 95 side) in the axial direction thereof. Further, the eccentric shaft 76 protrudes from a position facing the coupling protruding portion 73 in the circumferential direction on the other end surface (end surface on a support member 90 side) in the axial direction of the annular wall portion 71.

The eccentric shaft 76 is inserted into the eccentric shaft support portion 91 of the support member 90, and the swing rotation member 70B is swingably supported with respect to the second rotation member 15B. That is, the eccentric shaft support portion 91 of the support member 90 and the eccentric shaft 76 of the swing rotation member 70B constitute the "swing support portion" in the present invention.

A second engaging portion 80B is provided on an outer periphery of the annular wall portion 71. That is, a second engaging tooth 81 including a ridge extends in the axial direction from a position between the coupling protruding portion 73 and the eccentric shaft 76 on the outer periphery of the annular wall portion 71.

In addition, an abutment portion 86 bulging to form a curved surface shape is provided at a position facing the second engaging tooth 81 in a circumferential direction on one end side in the axial direction of the outer periphery of the annular wall portion 71.

Further, the outer cylindrical portion 35 of the first rotation member 30B includes an extension portion 35*a* extending in a predetermined direction (extending in the same direction as the inner cylindrical portion 33 and the intermediate cylindrical portion 37) from an outer peripheral edge portion of the base portion 31 having an annular plate shape and also extending in the opposite direction. A locked portion 35*b* having an annular protrusion shape protrudes from an outer periphery of a tip end of the extension portion 35*a* in an extension direction. Further, a plurality of first engaging teeth 41 protrude from an inner periphery of a base end portion of the extension portion 35*a* in the extension direction to form a first engaging portion 40B.

Figure 21:
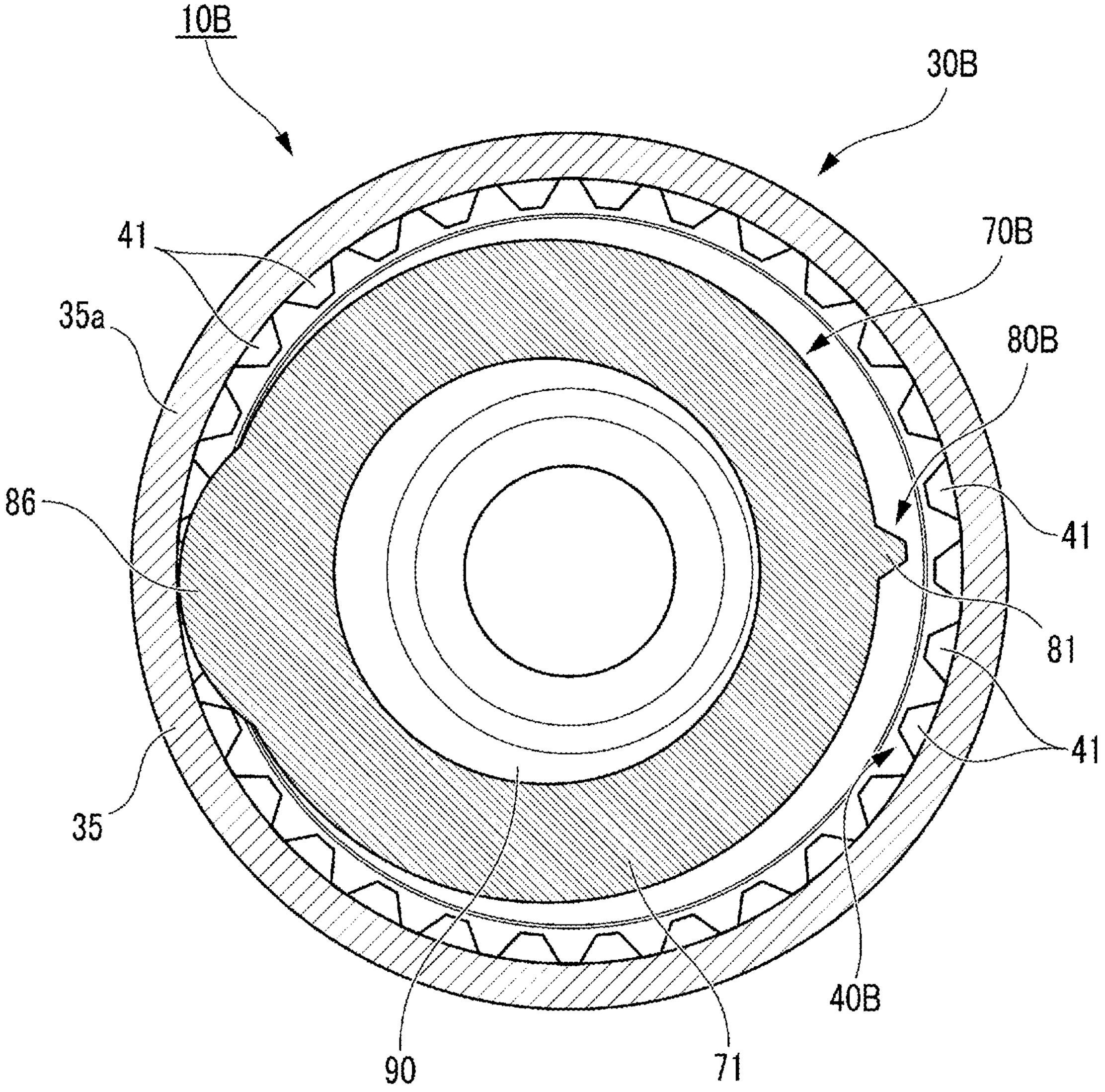
FIG. 21 is a cross-sectional view illustrating a state in which an abutment portion abuts against an inner periphery of a first rotation member in the rotation braking device.

As shown in FIG. 21, the first engaging teeth 41 and the second engaging tooth 81 in this embodiment have a substantially trapezoidal shape having both side surfaces having a tapered surface shape which gradually widens from a top portion toward a bottom portion, but as the engaging teeth 41, 81, for example, as in the engaging teeth 41, 81 in the embodiment shown in FIGS. 1 to 15, engaging surfaces where both the engaging teeth engage with each other may be formed in a shape engageable in a radial direction of the first rotation member, or may be formed to coincide with a normal line orthogonal to a tangent line to a rotation trajectory of the second rotation member.

Figure 20:
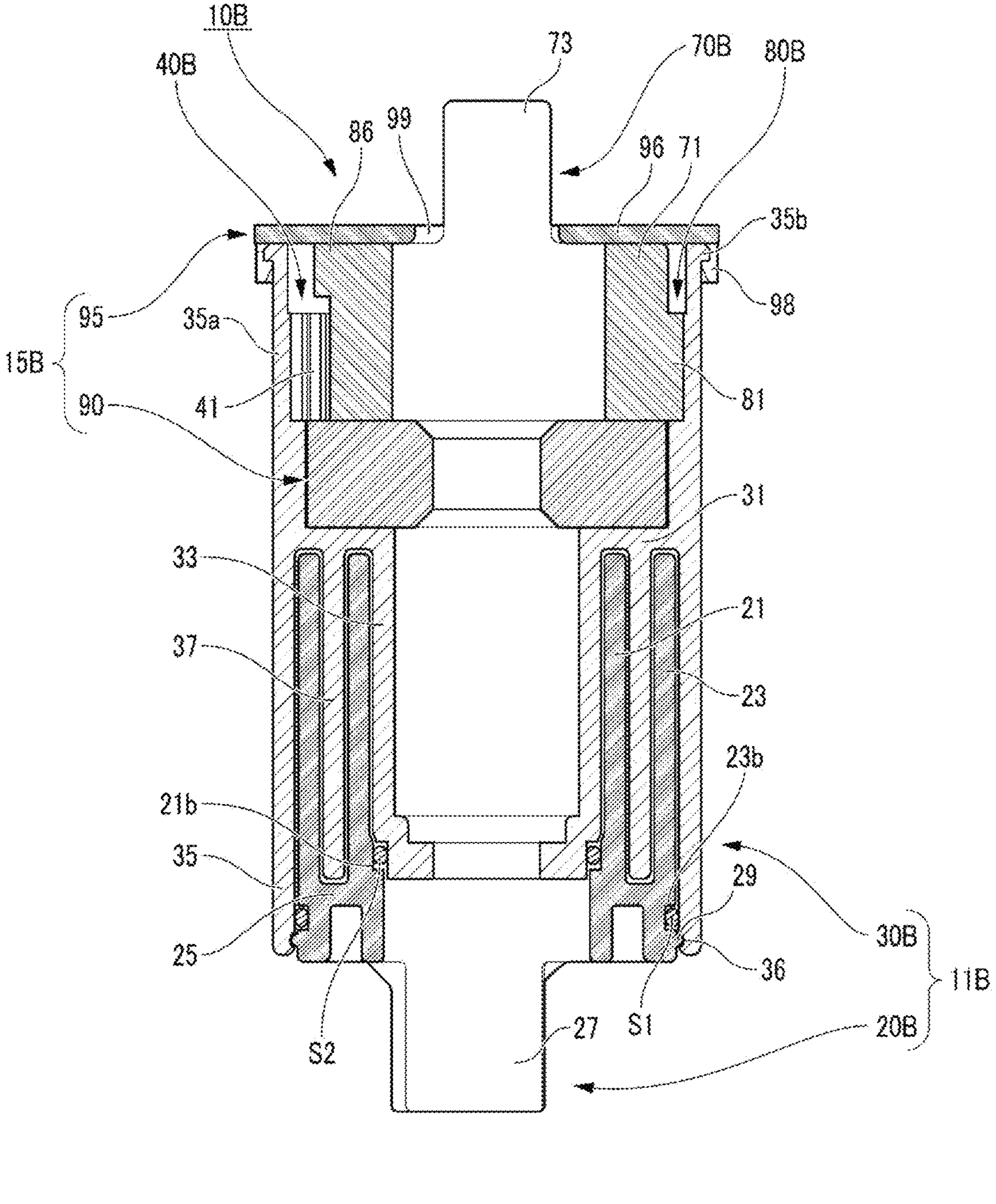
FIG. 20 is a cross-sectional view of the rotation braking device.

As shown in FIG. 20, the support member 90 is placed on the base portion 31 of the first rotation member 30B. Further, the locking portion 98 of the lid member 95 is locked to the locked portion 35*b* of the first rotation member 30B in a state in which the coupling protruding portion 73 of the swing rotation member 70B swingably supported by the support member 90 is inserted out of the coupling protruding portion insertion hole 99 of the lid member 95, whereby the lid member 95 is rotatably mounted to the opening portion on the other end side in the axial direction of the first rotation member 30B.

In this embodiment, when the other member rotates in a predetermined direction with respect to one member, the swing rotation member 70B also swings in a direction in which the second engaging portion 80B engages with the first engaging portion 40B, and the first rotation member 30B and the swing rotation member 70B integrally rotate, whereas when the other member rotates in a direction opposite to the predetermined direction with respect to the one member, the swing rotation member 70B swings in a direction in which the second engaging portion 80B is separated from the first engaging portion 40B, and the swing rotation member 70B idles with respect to the first rotation member 30B.

In addition, in this embodiment, a configuration is adopted in which the abutment portion 86 that abuts against the inner periphery of the first rotation member 30B when the swing rotation member 70B idles with respect to the first rotation member 30B is provided from an outer periphery of the swing rotation member 70B, and when the swing rotation member 70B idles with respect to the first rotation member 30B, the abutment portion 86 abuts against the inner periphery of the first rotation member 30B (inner periphery of the extension portion 35*a* of the outer cylindrical portion 35) to restrict the first engaging portion 40B from abutting against the outer periphery of the swing rotation member 70B (see FIG. 21).

Further, in this embodiment, when the braking member 11B and the swing rotation member 70B are viewed from the axial direction, at least the swing rotation member 70B is disposed on the inner periphery of the first rotation member 30B, and the swing support portion is disposed on the inside of the first rotation member 30B, so that the entire rotation braking device 10B can be made compact in the radial direction.

In this embodiment, when the swing rotation member 70B idles with respect to the first rotation member 30B, the abutment portion 86 abuts against the inner periphery of the first rotation member 30B, and the first engaging portion 40B can be restricted from abutting against the outer periphery of the swing rotation member 70B, so that the engagement between the first engaging portion 40B and the second engaging portion 80B can be reliably prevented, and when the other member is rotated in the R2 direction opposite to the predetermined R1 direction with respect to the one member, the other member can be smoothly operated with a small force, and a decrease in durability caused by the first engaging portion 40B abutting against the outer periphery of the swing rotation member 70B can be prevented.

Fourth Embodiment of Rotation Braking Device

Figure 22:
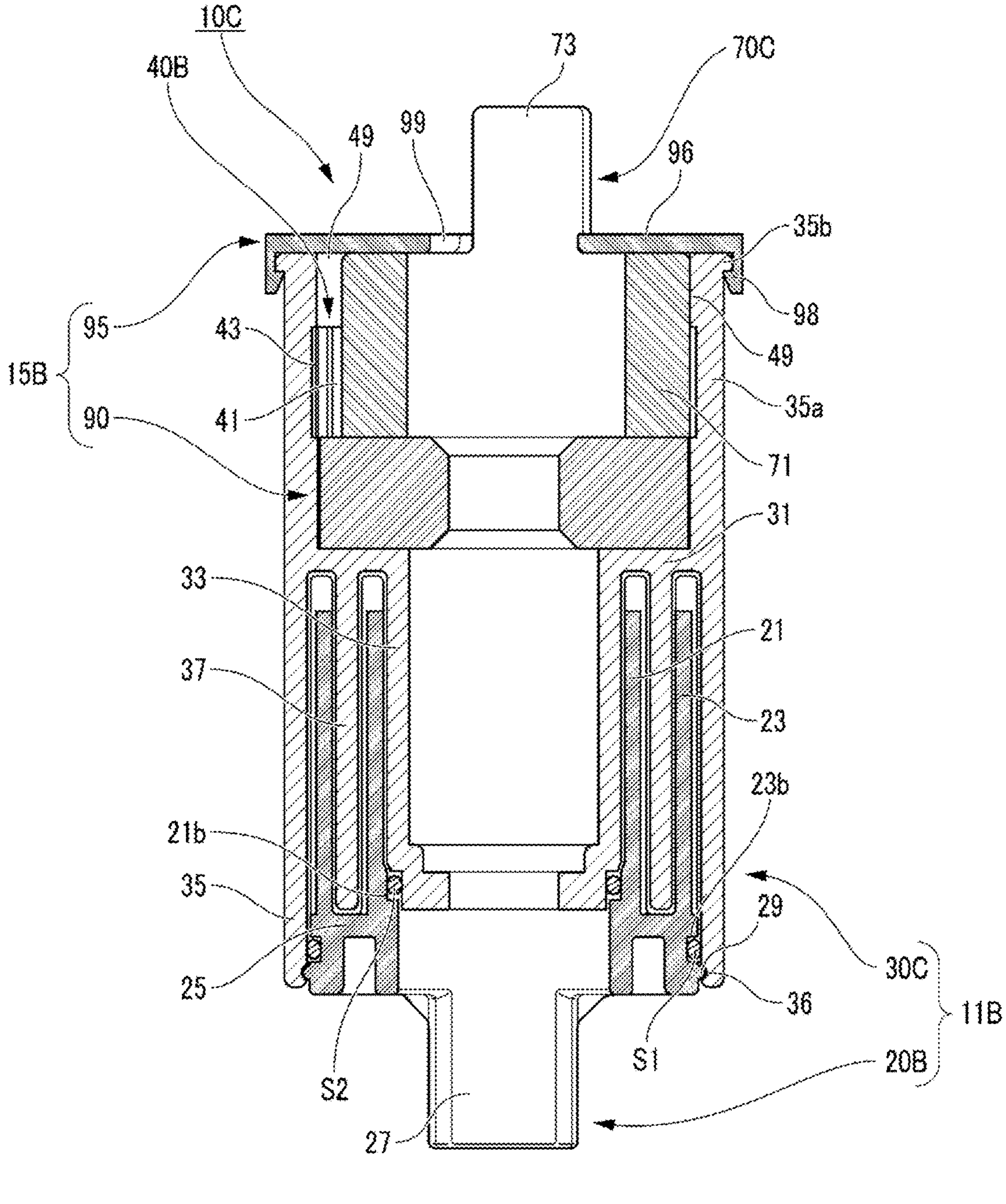
FIG. 22 is a cross-sectional view showing a rotation braking device according to a fourth embodiment of the present invention.
Figure 23:
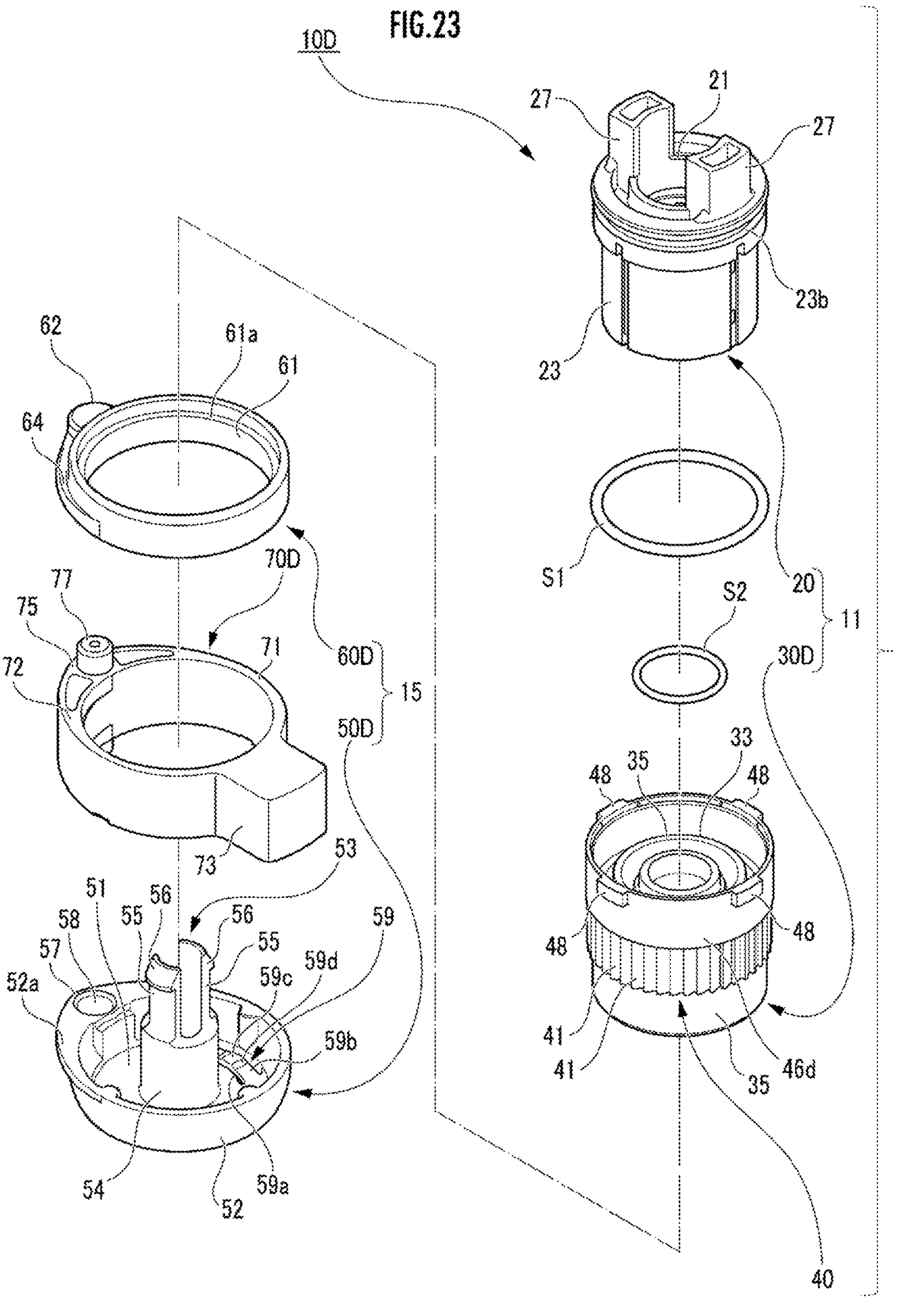
FIG. 23 is an exploded perspective view showing a rotation braking device according to a fifth embodiment of the present invention.

A rotation braking device according to the fourth embodiment of the present invention is shown in FIG. 22. The same reference signs are given to substantially the same parts as those in the above-described embodiments, and a description thereof will be omitted.

A rotation braking device 10C according to this embodiment basically has the same structure as that of the embodiment shown in FIGS. 18 to 21, but a formation position of an abutment portion is different from that of the embodiment shown in FIGS. 18 to 21.

That is, as illustrated in FIG. 22, a configuration is adopted in which an abutment portion 49 that abuts against an outer periphery of a swing rotation member 70C when the swing rotation member 70C idles with respect to the first rotation member 30C is provided in a manner of protruding from an inner periphery of the first rotation member 30C, and when the swing rotation member 70C idles with respect to the first rotation member 30C, the abutment portion 49 abuts against the outer periphery of the swing rotation member 70C to restrict the first engaging portion 40B from abutting against the outer periphery of the swing rotation member 70C.

In this embodiment, the abutment portion 49 having an annular protrusion shape protrudes from an inner periphery of a tip end portion in an extension direction of the extension portion 35*a* of the outer cylindrical portion 35 constituting the first rotation member 30C over an entire inner periphery of the extension portion 35*a*. The abutment portion 49 protrudes higher radially inward of the first rotation member 30C than the top portion 43 of each of the first engaging teeth 41 constituting the first engagement portion 40B (a radially inward protrusion amount of the abutment portion 49 is greater than a radially inward protrusion amount of the first engaging portion 40B).

In this embodiment, when the swing rotation member 70C idles with respect to the first rotation member 30C, the abutment portion 49 abuts against the outer periphery of the swing rotation member 70C, and the first engaging portion 40B can be restricted from abutting against the outer periphery of the swing rotation member 70C, so that the engagement between the first engaging portion 40B and the second engaging portion 80B can be reliably prevented, and when the second member 6 is rotated in the R2 direction, the second member 6 can be smoothly operated with a small force, and a decrease in durability caused by the first engaging portion 40B abutting against the outer periphery of the swing rotation member 70C can be prevented.

Fifth Embodiment of Rotation Braking Device

A rotation braking device according to a fifth embodiment of the present invention is shown in FIGS. 23 to 28. The same reference signs are given to substantially the same parts as those in the above-described embodiments, and a description thereof will be omitted.

A rotation braking device 10D according to this embodiment includes the same members as those of the embodiment shown in FIGS. 1 to 15, that is, the braking member 11 including the coupling member 20 and the first rotation member 30D, the second rotation member 15 including a first case 50D and a second case 60D, and a swing rotation member 70D.

In the first rotation member 30D, an abutment portion 46*d* that abuts against an inner periphery of the swing rotation member 70D when the swing rotation member 70D idles is provided over an entire circumference of the outer cylindrical portion 35 between the first engaging portion 40 and a tip end portion (end portion in which an opening is formed) of the outer cylindrical portion 35 in an extension direction.

The first case 50D constituting the second rotation member 15 includes the bottom portion 51 having a substantially annular plate shape, the peripheral wall portion 52 having a substantially annular shape erected from an outer peripheral edge portion of the bottom portion 51, and a substantially cylindrical rotation shaft portion 53 extending from an inner peripheral edge portion of the bottom portion 51 by a predetermined length.

Figure 25:
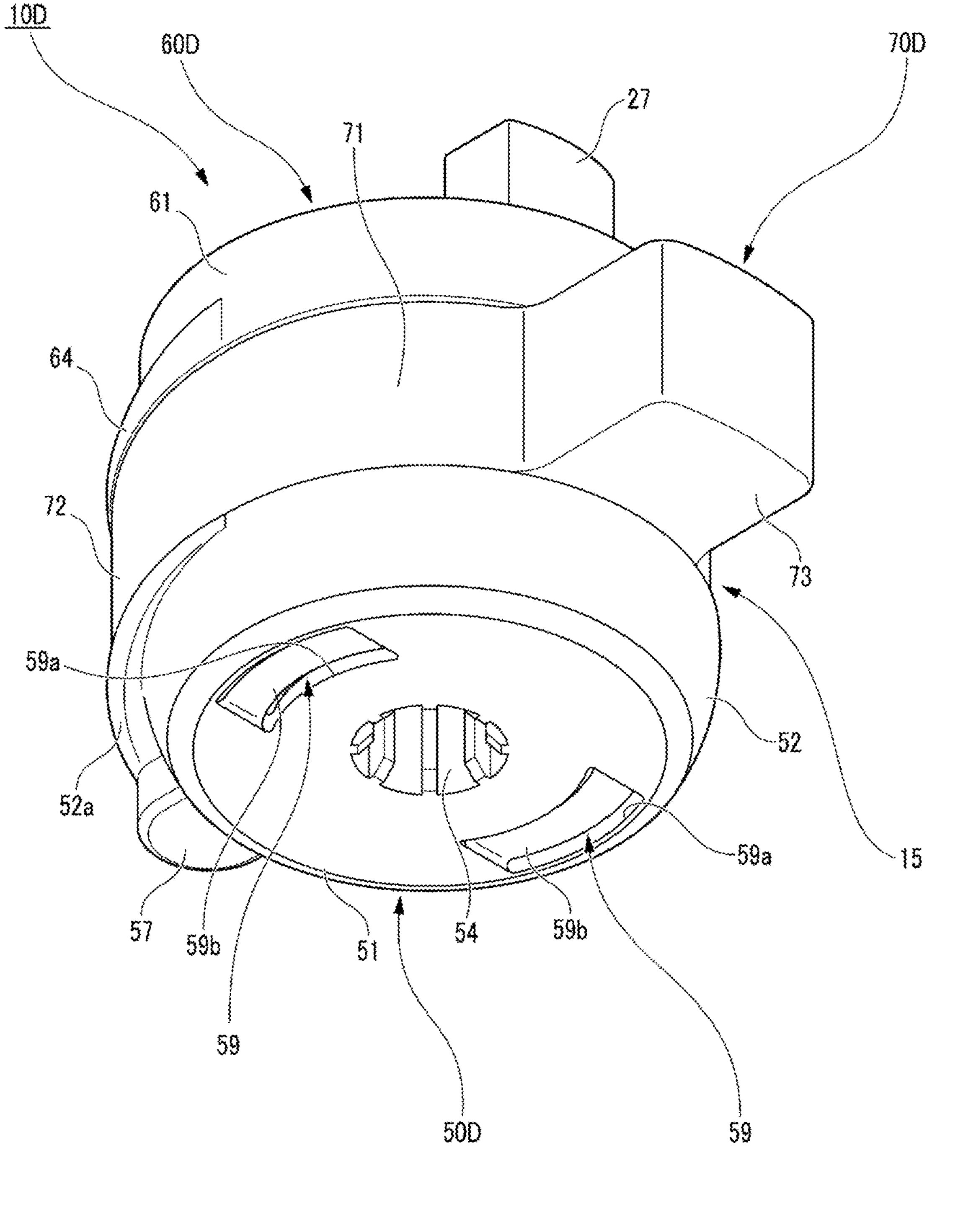
FIG. 25 is a perspective view of the rotation braking device as viewed from a direction different from that in FIG. 24.
Figure 26:
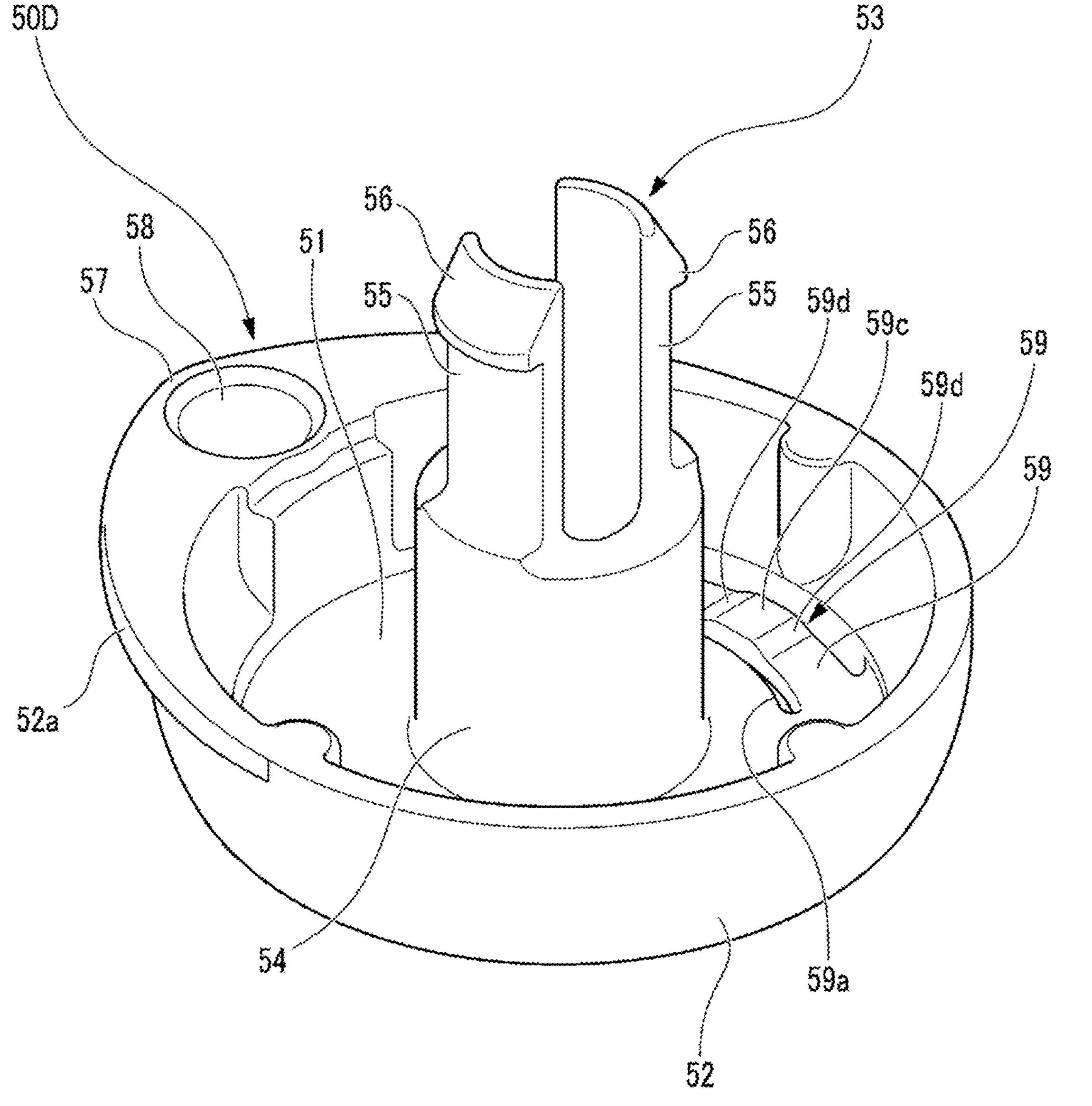
FIG. 26 is a perspective view of a first case constituting a second rotation member of the rotation braking device.

As shown in FIG. 25, the bulging portion 57 bulging from an outer periphery of the peripheral wall portion 52 is provided at a predetermined position of the peripheral wall portion 52 in a circumferential direction. The eccentric shaft support portion 58 having a circular hole shape is formed at a corresponding position of the bulging portion 57 and the peripheral wall portion 52.

Furthermore, a thin plate-shaped flange portion 52*a* that protrudes toward the eccentric shaft support portion 58 and has a curved outer periphery is provided between a tip end portion of the peripheral wall portion 52 in an erected direction and a tip end portion of the bulging portion 57 in an axial direction.

As in the above embodiment, both the cylindrical portions 21, 23 of the coupling member 20, the cylindrical portions 33, 35, 37 of the first rotation member 30D, and the rotation shaft portion 53 of the first case SOD constitute a “rotation support portion” in the present invention. An axis of the rotation support portion is denoted by “C1” (see FIG. 27).

Similarly to the above embodiment, the eccentric shaft support portions 58, 63 of the second rotation member 15 and the eccentric shafts 76, 77 of the swing rotation member 70D constitute a “swing support portion” in the present invention. An axis of the swing support portion is denoted by “C2” (see FIG. 27).

Further, the rotation shaft portion 53 includes the pair of bendable pieces 55, 55 extending from a tip end portion of the base portion 54 in an extension direction in a bifurcated manner, and the claw portions 56, 56 protrude from outer surfaces of tip end portions in the extension direction of the bendable pieces 55.

Figure 27:
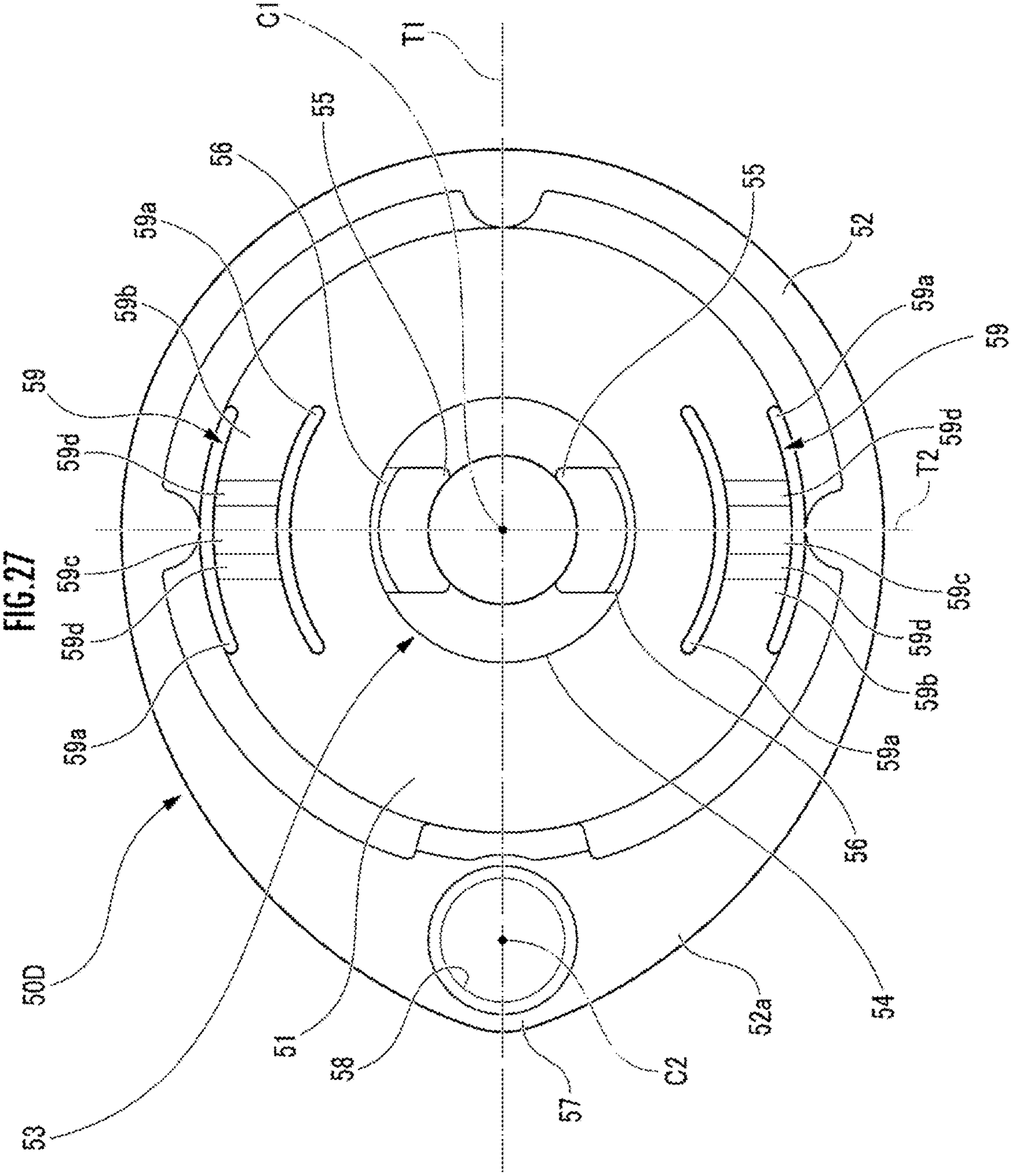
FIG. 27 is a plan view of the first case constituting the second rotation member of the rotation braking device.

As illustrated in FIG. 27, in a plan view of the first case 50D constituting the second rotation member 15 (when the first case 50D is viewed from a planar direction), the pair of claw portions 56, 56 are disposed at positions orthogonal to a straight line T1 connecting the axis C1 of the rotation support portion and the axis C2 of the swing support portion so as to sandwich the straight line T1. In this embodiment, the pair of claw portions 56, 56 are disposed on a straight line T2 that is orthogonal to the straight line T1 and passes through the axis C1 of the rotation support portion.

In FIG. 27, for convenience of description, other members constituting the rotation support portion and the swing support portion other than the first case 50D are omitted.

Furthermore, a pair of elastic abutment portions 59, 59 are formed on the bottom portion 51 of the first case SOD at positions facing each other in a radial direction so as to be elastically deformable (bendable and deformable) via a plurality of slits 59*a*. In other words, in the plan view of the first case 50D, the pair of elastic abutment portions 59, 59 are provided at positions orthogonal to the straight line T1 and at positions radially outward of the pair of claw portions 56, 56 of the rotation shaft portion 53 so as to sandwich the straight line T1.

In this embodiment, the pair of elastic abutment portions 59, 59 are disposed on the straight line T2 that is orthogonal to the straight line T1 and passes through the axis C1 of the rotation support portion and on an outside in the radial direction of the pair of claw portions 56, 56. Further, it can also be said that the pair of elastic abutment portions 59, 59 are disposed so as to be line-symmetric with respect to the straight line T1 in the plan view of the first case 50D.

As a more specific layout of the elastic abutment portions 59, as shown in FIG. 27, the pair of slits 59*a*. 59*a* each extending in an arc shape with a predetermined circumferential length are respectively formed at a position adjacent to an inner periphery of the peripheral wall portion 52 and a position spaced apart from the position by a predetermined distance on an inside in the radial direction on the above position of the bottom portion 51, and the elastic abutment portions 59 are formed on the inside thereof via the pairs of slits 59*a*, 59*a*.

Figure 28:
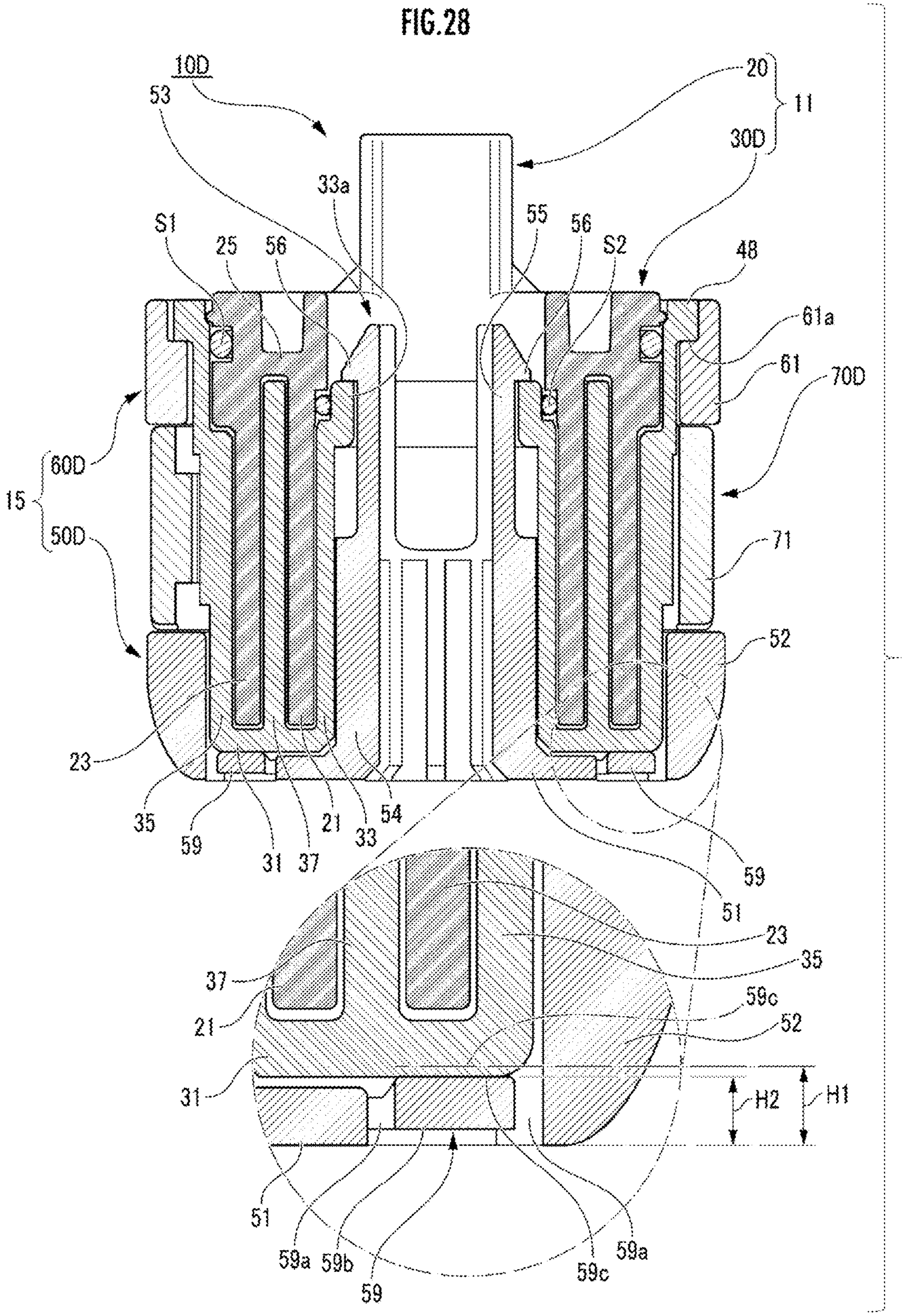
FIG. 28 is a cross-sectional view taken along a line E-E in FIG. 24.

As shown in FIG. 28, each of the elastic abutment portions 59 elastically abuts against an outer surface of the base portion 31 of the first rotation member 30D (a surface opposite to an inner surface from which the inner cylindrical portion 33 and the like extend, that is, a surface facing the bottom portion 51 of the first case 50D) (this will be described in detail later).

That is, the pair of elastic abutment portions 59, 59 are provided at positions orthogonal to the straight line T1 connecting the axis C1 of the rotation support portion and the axis C2 of the swing support portion so as to sandwich the straight line T1 (see FIG. 27).

Each of the elastic abutment portions 59 includes an elastic piece 59*b* that is formed on the bottom portion 51 in a manner of extending in an arc shape along an inner peripheral shape of the peripheral wall portion 52 and that is bendable and deformable.

As shown in FIGS. 25 and 28, an outer surface of the elastic piece 59*b* (which means a surface opposite to a surface (inner surface) facing the base portion 31 of the first rotation member 30D. It can also be called a bottom surface) is provided in a manner of being recessed by a predetermined depth from an outer surface (which is a surface opposite to the surface facing the base portion 31 of the first rotation member 30D) of the bottom portion 51 toward an inner surface of the bottom portion 51 (which is a surface opposite to the outer surface and is a surface facing the base portion 31 of the first rotation member 30D).

An inner surface (which is a surface opposite to the outer surface, and means a surface facing the base portion 31 of the first rotation member 30D, and can also be referred to as a ceiling surface) of the elastic piece 59*b* at both end portions in the circumferential direction coincides with the inner surface of the bottom portion 51. That is, the inner surface of the elastic piece 59*b* at both the end portions in the circumferential direction and the inner surface of the bottom portion 51 have the same height.

The elastic abutment portion 59 includes a top portion 59*c* having a flat surface shape protruding higher toward the base portion 31 of the first rotation member 30D than the inner surface of the bottom portion 51 on an inner surface side of the elastic piece 59*b* at a central portion in the circumferential direction. Further, inclined surfaces 59*d*, 59*d* whose protrusion amount gradually decreases are formed on both side portions of the top portion 59*c* in a width direction.

When a height of the top portion 59*c* (see two-dot chain line in FIG. 28) of the elastic abutment portion 59 with respect to the outer surface of the bottom portion 51 of the first case 50D in a free state of the elastic abutment portion 59 is "H1", and a height of the outer surface of the base portion 31 of the first rotation member 30D with respect to the outer surface of the bottom portion 51 of the first case 50D in a state in which the pair of claw portions 56, 56 of the first case 50D is locked to the tip end portion 33*a* of the inner cylindrical portion 33 of the first rotation member 30D and the first case 50D is mounted on the first rotation member 30D is "H2", H1>H2 is set.

As a result, as described above, when the pair of claw portions 56, 56 of the first case 50D is locked to the tip end portion 33*a* of the inner cylindrical portion 33 of the first rotation member 30D and the first case 50D is mounted on the first rotation member 30D, the top portion 59*c* of the elastic abutment portion 59 is pressed against the outer surface of the base portion 31 of the first rotation member 30D, the elastic piece 59*b* is elastically deformed, and the top portion 59*c* elastically abuts against the outer surface of the base portion 31. That is, the elastic abutment portion 59 elastically abuts against the base portion 31 of the first rotation member 30D (see FIG. 28).

The second case 60D constituting the second rotation member 15 includes the peripheral wall portion 61. A thin plate-shaped flange portion 64 that has a shape fitting to the flange portion 52*a* of the first case 50D, that is, that protrudes toward the eccentric shaft support portion 63 (not shown) and has a curved outer periphery, is provided between a base end portion of the peripheral wall portion 61 in an axial direction and a tip end portion of the bulging portion 62 in the axial direction.

Figure 24:
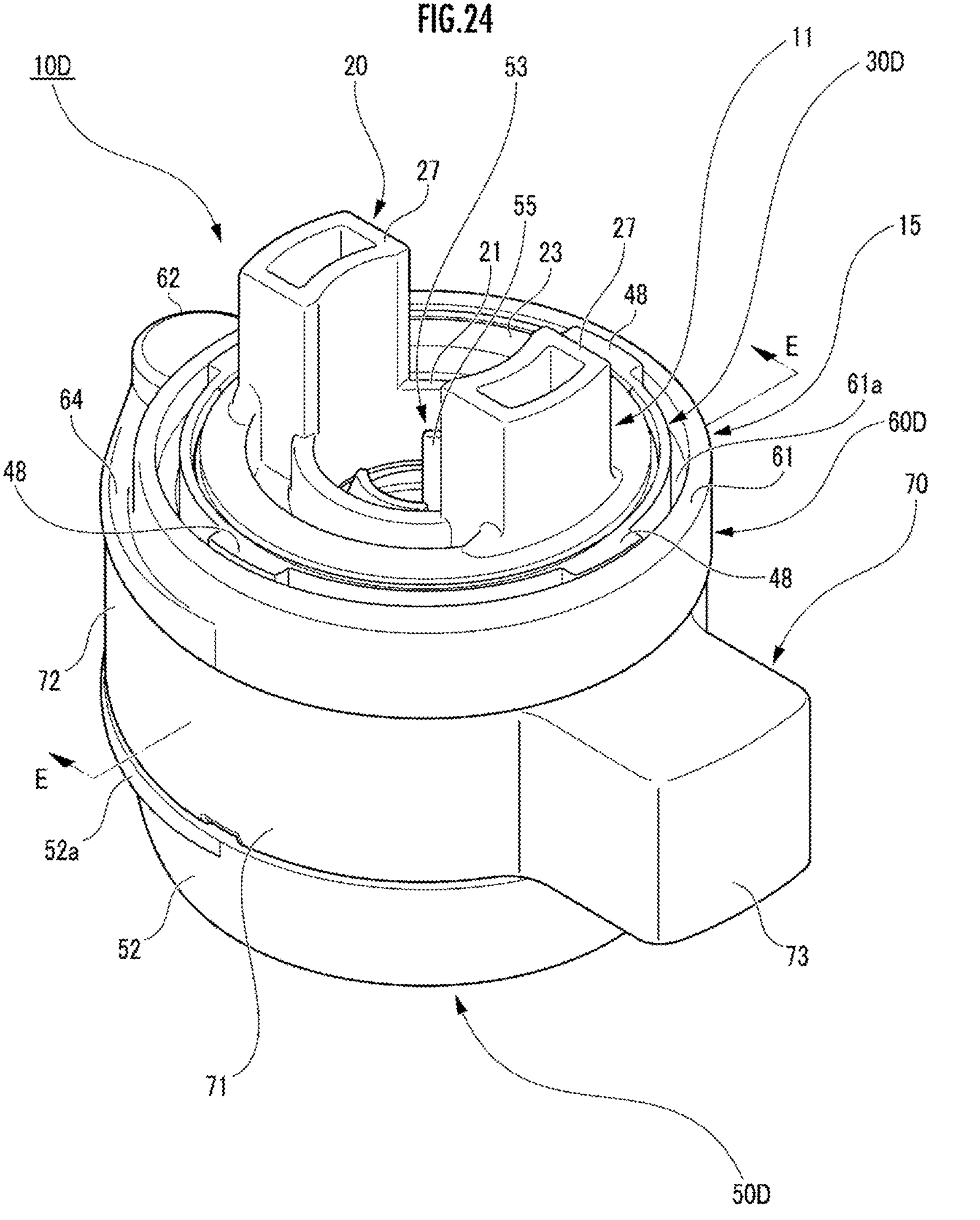
FIG. 24 is a perspective view of the rotation braking device.

Further, a locking stepped portion 61*a* having a stepped shape is formed on an inner periphery of a tip end portion of the peripheral wall portion 61 in the axial direction. Further, the plurality of locking protruding portions 48 of the first rotation member 30D enter an inside of the tip end portion of the peripheral wall portion 61 in the axial direction, and each locking protruding portion 48 is locked to the locking stepped portion 61*a*. At this time, as shown in FIG. 24, since a protrusion amount of the locking protruding portion 48 from the tip end portion in the axial direction of the peripheral wall portion 61 of the second case 60D is reduced, the locking protruding portion 48 can be protected, and interference of the locking protruding portion 48 with other members can be prevented.

Further, between the annular wall portion 71 of the swing rotation member 70D and the eccentric shafts 76, 77, a protruding portion 72 that has a shape fitting to the flange portion 52*a* of the first case 50D and the flange portion 64 of the second case 60D, that is, that protrudes toward the eccentric shafts 76, 77 and has a curved outer periphery is provided.

In the fifth embodiment described above, the configuration in which the elastic abutment portion 59 is provided on one of the second rotation member or the first rotation member and elastically abuts against the other, that is, the configuration in which the elastic abutment portion 59 is provided on the first case 50D constituting the second rotation member 15 which is one member and elastically abuts against the first rotation member 30D which is the other member, is adopted.

However, as a layout of the elastic abutment portion, a configuration may be adopted in which the elastic abutment portion is provided on one of the second rotation member or the coupling member and elastically abuts against the other, or a configuration may be adopted in which the elastic abutment portion is provided on one of the second rotation member or the first rotation member and elastically abuts against the other, and the elastic abutment portion is provided on one of the second rotation member or the coupling member and elastically abuts against the other (the configuration in which the elastic abutment portions are disposed at two positions).

Although the pair of elastic abutment portions 59, 59 in this embodiment are disposed on the straight line T2 that is orthogonal to the straight line T1 connecting the axis C1 of the rotation support portion and the axis C2 of the swing support portion and passes through the axis C1 of the rotation support portion, the pair of elastic abutment portions may be disposed on an eccentric shaft support portion 58 side (left side of the straight line T2 in FIG. 27) or may be disposed on a side opposite to the eccentric shaft support portion 58 in the radial direction (right side of the straight line T2 in FIG. 27) without being disposed on the straight line T2. The number of elastic abutment portions may be one or three or more.

Further, as a shape and a structure of the elastic abutment portion, for example, the top portion of the elastic abutment portion may be formed in an arc shape or a curved surface shape, or may be formed in a mountain protrusion (triangular protrusion) shape. Further, the elastic abutment portion 59 according to this embodiment includes the elastic piece 59*b* having an arc shape extending along the inner peripheral shape of the peripheral wall portion 52 of the bottom portion 51, and has a double-supported beam shape in which both end portions thereof in the circumferential direction are connected to the bottom portion 51 of the first case 50D, but the elastic abutment portion may be in the form of a cantilever beam, or may be in the form of an elastic piece extending linearly with a predetermined length.

In this embodiment, the elastic abutment portion 59 configured as described above applies rotation resistance to the second rotation member 15 against the first rotation member 30D and the coupling member 20 (it can also be said that the rotation resistance is applied to the second rotation member 15 from the first rotation member 30D and the coupling member 20), thereby preventing a rotation operation of the second rotation member 15.

Here, the elastic abutment portion 59 provided in the first case 50D constituting the second rotation member 15 elastically abuts against the first rotation member 30D, whereby the rotation resistance against the first rotation member 30D is applied to the first case 50D, and the rotation operation of the entire second rotation member 15 is prevented. Therefore, the swing rotation member 70D can be reliably swung with respect to the second rotation member 15.

That is, when the second member 6 is lifted upward (see FIGS. 13 and 14) while the swing rotation member 70D idles with respect to the first rotation member 30D (see FIGS. 11 and 12) from a state in which the opening portion 4 of the first member 1 is closed by the second member 6, and then the hand is released from the second member 6, it is desired that the swing rotation member 70D reliably swings with respect to the second rotation member 15, and the second engaging portion 80 of the swing rotation member 70D engages with the first engaging portion 40 of the first rotation member 30D.

If the rotation operation of the second rotation member 15 is not prevented, there is a possibility that the swing rotation member 70D rotates together with the second rotation member 15 and does not swing with respect to the second rotation member 15, and the engaging portions 40, 80 may not engage with each other.

On the other hand, in the present embodiment, as described above, as a result of the rotation operation of the entire second rotation member 15 being prevented, the swing rotation member 70D can be reliably swung with respect to the second rotation member 15, so that the second engaging portion 80 of the swing rotation member 70D can be reliably engaged with the first engaging portion 40 of the first rotation member 30D, and a braking force of the braking member 11 can be reliably obtained.

In addition, when the second member 6, which is the other member, is rotated in a predetermined direction with respect to the first member 1, which is the one member, to generate the braking force, and then the other member is rotated in a direction opposite to the predetermined direction with respect to the one member (here, when the second member 6 is rotated upward while the swing rotation member 70D idles with respect to the first rotation member 30D from the state in which the opening portion 4 of the first member 1 is closed by the second member 6 as shown in FIGS. 11 to 14), the second rotation member 15 rotates while the elastic abutment portion 59 provided on the one member elastically abuts against the other member (such that the elastic abutment portion 59 slides on other members while being appropriately elastically deformed).

As a result, an influence of the elastic abutment portion 59 can be minimized, and the other member can be relatively smoothly rotated with respect to the one member.

Further, in this embodiment, as shown in FIG. 27, the pair of elastic abutment portions 59, 59 are provided at the positions orthogonal to the straight line T1 connecting the axis C1 of the rotation support portion and the axis C2 of the swing support portion so as to sandwich the straight line T1.

According to the above-described aspect, since the pair of elastic abutment portions 59, 59 are provided in the above-described layout, the elastic abutment portion 59 provided on the one member can elastically abut against the other member uniformly in a well-balanced manner while preventing an inclination of the second rotation member 15, and as a result, the rotation resistance against the first rotation member 30D and the coupling member 20 can be more stably applied to the second rotation member 15.

In addition, for example, in a case in which the pair of elastic abutment portions 59, 59 are provided on the bottom portion of the second rotation member 15 (here, the bottom portion 51 of the first case 50D), the pair of elastic abutment portions 59, 59 are less likely to interfere with attachment of the second rotation member 15 and the first rotation member 30, and thus attachment workability of the second rotation member 15 and the first rotation member 30D can be improved.

Further, since the pair of elastic abutment portions 59, 59 are provided in the above-described layout, rattling of the second rotation member 15 with respect to the first rotation member 30D in the axial direction can be prevented.

Sixth Embodiment of Rotation Braking Device

Figure 29:
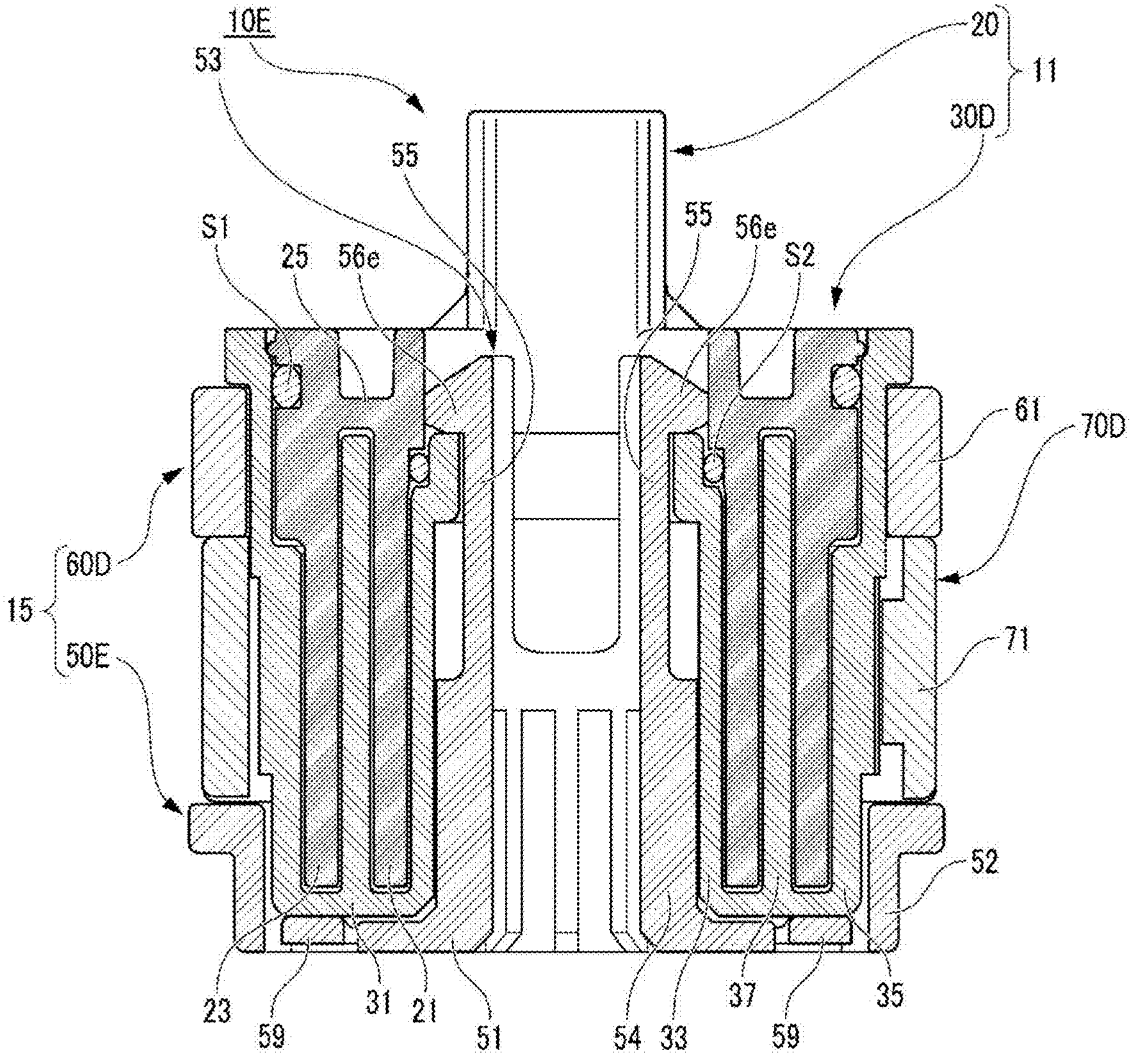
FIG. 29 is a cross-sectional view showing a rotation braking device according to a sixth embodiment of the present invention.

A rotation braking device according to a sixth embodiment of the present invention is shown in FIG. 29. The same reference signs are given to substantially the same parts as those in the above-described embodiments, and a description thereof will be omitted.

A rotation braking device 10E according to this embodiment basically has the same structure as that of the fifth embodiment shown in FIGS. 23 to 28, but shapes of a pair of claw portions 56*e*, 56*e* of a first case 50E are different from those of the fifth embodiment.

That is, the pair of claw portions 56*e*, 56*e* provided on the rotation shaft portion 53 of the first case 50E in this embodiment protrude from outer surfaces of tip end portions in an extension direction of the pair of bendable pieces 55, 55 to elastically abut on an inner peripheral surface of a base end portion in the extension direction of the inner cylindrical portion 21 of the coupling member 20. Further, the pair of claw portions 56*e*, 56*e* form "elastic abutment portions" in the present invention.

That is, the elastic abutment portions in the sixth embodiment has a total of four elastic abutment portions of two types, that is, the pair of elastic abutment portions 59, 59 provided in the first case 50E constituting the second rotation member 15 which is one member and elastically abut against the first rotation member 30D which is the other member, and the pair of claw portions 56*e* and 56*e* provided in the first case 50E constituting the second rotation member 15 which is the one member and elastically abut against the coupling member 20 which is the other member.

Further, in this embodiment, the same operations and effects as those of the fifth embodiment can also be obtained. In addition, the number of elastic abutment portions can be increased as compared with the elastic abutment portions according to the fifth embodiment, and positions of the elastic abutment portions can be dispersed in an axial direction of the rotation braking device 10.

As a result, it is possible to increase rotation resistance against the first rotation member 30D and the coupling member 20 to the second rotation member 15 (rotation resistance applied from the first rotation member 30D and the coupling member 20 to the second rotation member 15), and to stably apply the rotation resistance in the axial direction in a well-balanced manner.

The present invention is not limited to the embodiments described above, various modified embodiments can be made within the scope of the gist of the present invention, and such embodiments are also included in the scope of the present invention.

REFERENCE SIGNS LIST

1 one member (first member)
6 the other member (second member)
10, 10A, 10B, 10C, 10D, 10E rotation braking device
11, 11B braking member
15, 15B second rotation member
20, 20B coupling member
30, 30A, 30B, 30C, 30D first rotation member
40, 40B first engaging portion
41 first engaging tooth

46 abutment portion
49 abutment portion
50, 50D, 50E first case
56*e* claw portion (elastic abutment portion)
59 elastic abutment portion
60, 60D second case
70, 70A, 70B, 70C, 70D swing rotation member
74 abutment portion
80, 80B second engaging portion
81 second engaging tooth
86 abutment portion
90 support member
95 lid member

The invention claimed is:

1. A rotation braking device that is configured to be attached between a first member and a second member configured to rotate relative to each other and that is configured to apply a braking force when the second member rotates in a predetermined direction with respect to the first member, the rotation braking device comprising:

a braking member including a coupling member that is coupled to the first member and a first rotation member configured to rotate with respect to the coupling member via a rotation support portion, and configured to generate the braking force when the first rotation member rotates with respect to the coupling member;

a second rotation member coaxially and rotatably mounted on the braking member via the rotation support portion; and a swing rotation member coupled to the second member, swingably supported with respect to the second rotation member via a swing support portion, and disposed on an outer periphery or an inner periphery of the first rotation member, wherein the first rotation member includes a first engaging portion configured to engage with the swing rotation member, the swing rotation member includes a second engaging portion configured to engage with the first engaging portion in a connectable and separable manner, a swing direction of the swing rotation member is to change depending on a rotation direction of the second member, when the second member rotates in the predetermined direction with respect to the first member, the swing rotation member swings in a direction in which the second engaging portion engages with the first engaging portion, and the first rotation member and the swing rotation member integrally rotate, and when the second member rotates in a direction opposite to the predetermined direction with respect to the first member, the swing rotation member swings in a direction in which the second engaging portion is separated from the first engaging portion, and the swing rotation member idles with respect to the first rotation member.

2. The rotation braking device according to claim 1, wherein the swing rotation member is disposed on the outer periphery of the first rotation member, and the swing support portion is disposed outside the first rotation member.

3. The rotation braking device according to claim 1, wherein at least a part of the swing rotation member is disposed on the inner periphery of the first rotation member, and the swing support portion is disposed inside the first rotation member.

4. The rotation braking device according to claim 1, wherein the outer periphery of the first rotation member and an inner periphery of the swing rotation member each have a circular shape, an abutment portion that abuts against the inner periphery of the swing rotation member when the swing rotation member idles with respect to the first rotation member is provided in a manner of protruding from the outer periphery of the first rotation member, or an abutment portion that abuts against the outer periphery of the first rotation member when the swing rotation member idles with respect to the first rotation member is provided in a manner of protruding from the inner periphery of the swing rotation member, the first engaging portion is provided on the outer periphery of the first rotation member at a position shifted in an axial direction with respect to the abutment portion, and when the swing rotation member idles with respect to the first rotation member, the abutment portion abuts against the inner periphery of the swing rotation member or the outer periphery of the first rotation member to restrict the first engaging portion from abutting against the inner periphery of the swing rotation member.

5. The rotation braking device according to claim 1, wherein the inner periphery of the first rotation member and an outer periphery of the swing rotation member each have a circular shape, an abutment portion that abuts against the inner periphery of the first rotation member when the swing rotation member idles with respect to the first rotation member is provided from the outer periphery of the swing rotation member, or an abutment portion that abuts against the outer periphery of the swing rotation member when the swing rotation member idles with respect to the first rotation member is provided from the inner periphery of the first rotation member, the first engaging portion is provided on the inner periphery of the first rotation member at a position shifted in an axial direction with respect to the abutment portion, and when the swing rotation member idles with respect to the first rotation member, the abutment portion abuts against the inner periphery of the first rotation member or the outer periphery of the swing rotation member to restrict the first engaging portion from abutting against the outer periphery of the swing rotation member.

6. The rotation braking device according to claim 1, wherein the first engaging portion includes a plurality of first engaging teeth formed on the outer periphery or the inner periphery of the first rotation member, the second engaging portion includes one or a plurality of second engaging teeth configured to engage with the first engaging teeth in the connectable and separable manner, and an engaging surface where the first engaging teeth and the second engaging teeth engage when the first rotation member and the swing rotation member rotate integrally is formed to coincide with a normal line orthogonal to a tangent line to a rotation trajectory of the second rotation member to rotate with respect to the braking member, or has a shape engageable in a radial direction of the first rotation member.

7. The rotation braking device according to claim 1, further comprising:

an elastic abutment portion that is provided on one of the second rotation member or the first rotation member and that is configured to elastically abut against the other of the second rotation member or the first rotation member, and/or that is provided on one of the second rotation member or the coupling member and that is configured to elastically abut against the other of the second rotation member or the coupling member.

8. The rotation braking device according to claim 7, wherein a pair of the elastic abutment portions are provided at positions orthogonal to a straight line connecting an axis of the rotation support portion and an axis of the swing support portion to sandwich the straight line.

* * * * *